United States Patent [19]

Takashima

[11] Patent Number: 4,483,010
[45] Date of Patent: Nov. 13, 1984

[54] AUTOMATIC EQUALIZER

[75] Inventor: Shigekazu Takashima, Fukaya, Japan

[73] Assignee: Tokyo Shibaura Denki Kabushiki Kaisha, Kawasaki, Japan

[21] Appl. No.: 394,440

[22] Filed: Jul. 1, 1982

[51] Int. Cl.$^3$ ............................................. H04B 3/18
[52] U.S. Cl. ..................................... 375/14; 358/905; 333/18
[58] Field of Search ............... 364/724, 728, 819, 825; 375/14, 15, 16; 333/18; 358/905

[56] References Cited

U.S. PATENT DOCUMENTS

| | | | |
|---|---|---|---|
| 4,224,679 | 9/1980 | Nossen et al. | 364/728 |
| 4,389,623 | 6/1983 | Onishi et al. | 358/905 |
| 4,404,600 | 9/1983 | Murakami | 358/905 |
| 4,414,641 | 11/1983 | Jarrett | 364/728 |

OTHER PUBLICATIONS

EMCJ 80-67, (Oct. 1980), "Ghost Canceller Utilizing An Integrated CCD".
IEEE Transactions CE-26,3, p. 629, Aug. 1980, "A Novel Automatic Ghost Canceller".

Primary Examiner—Benedict V. Safourek
Attorney, Agent, or Firm—Cushman, Darby & Cushman

[57] ABSTRACT

An automatic equalizer includes two wave memories. These wave memories jointly constitute a wave integration memory for storing amplitude information of an input signal. The wave form of input signal to be equalized is divided into fragments along time base, and the amplitude components (analog) of respective fragments are sequentially converted to digital forms in a manner that these fragmentary digital components are alternatively distributed to respective wave memories. For instance, the digital components of odd number fragments are stored in one wave memory, and the digital components of even number fragments are stored in the other wave memory. In this case, the read/write speed of each wave memory may be half of the read/write speed of a prior art wave integration memory which should store all fragments of the digital components.

The fragmentary digital components corresponding to the input signal wave form are divided into at least two groups, e.g. an odd group and an even group. A correlator of the automatic equalizer possesses a function for differentiating the fragmentary digital components. The differentiation operation is carried out with the correlation operation by subtracting one fragmentary component of even group from that of odd group.

22 Claims, 23 Drawing Figures

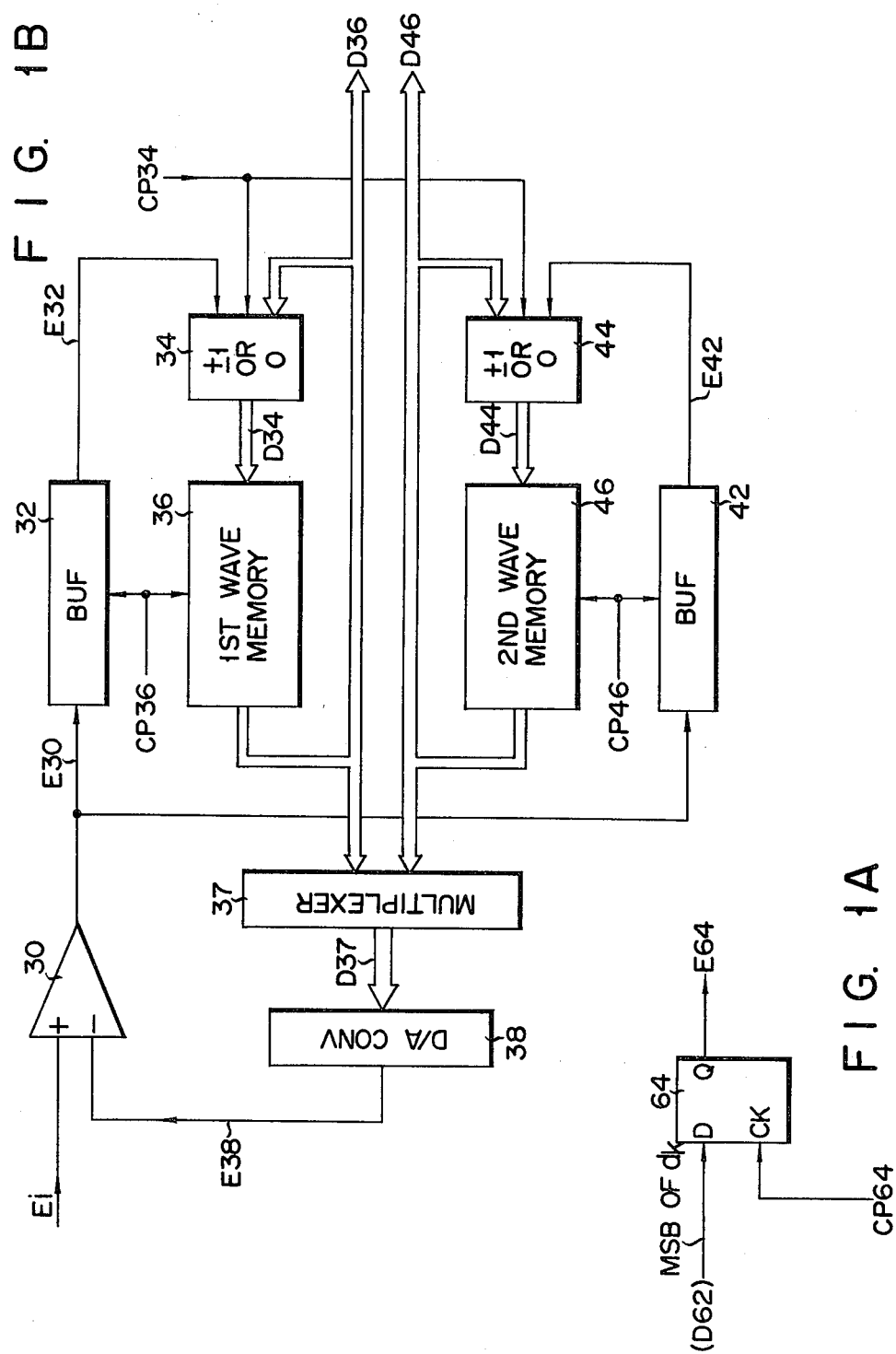

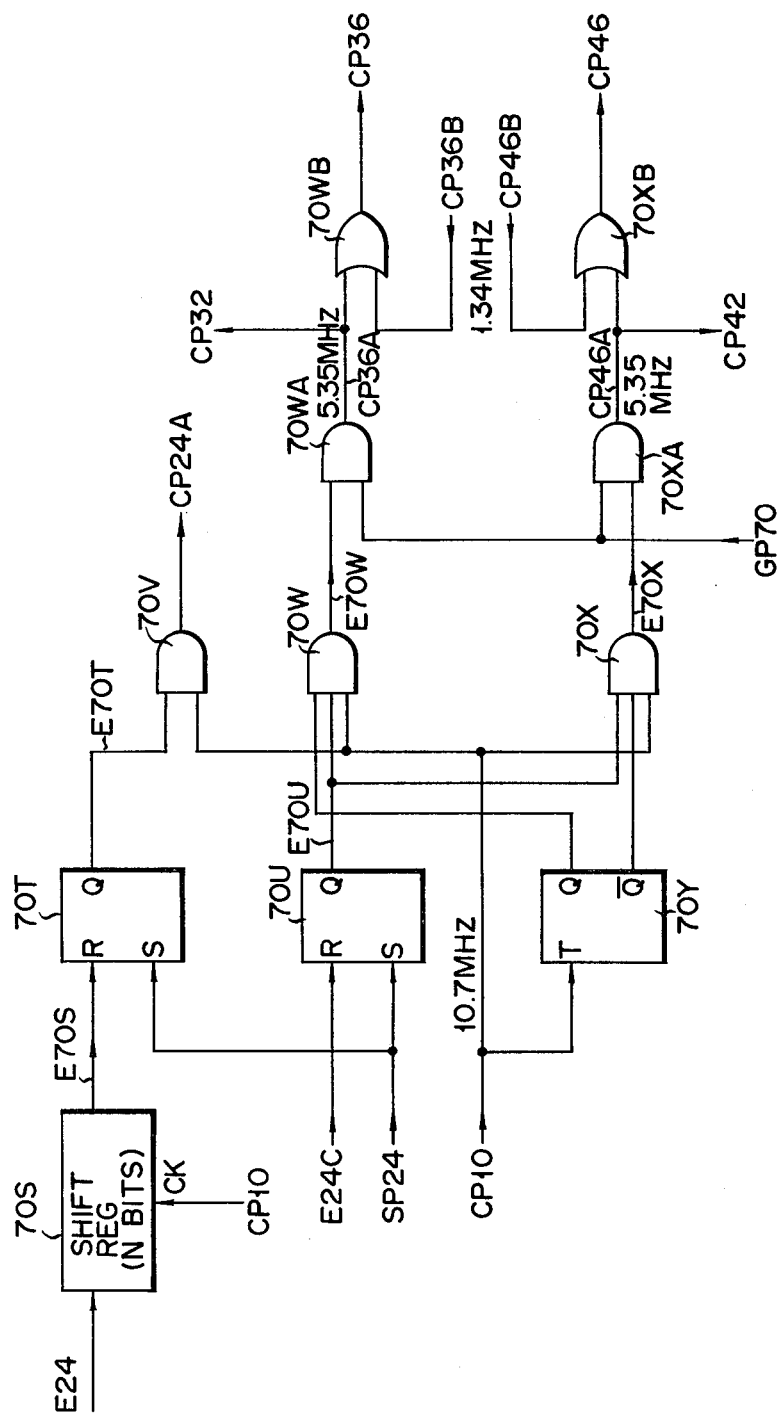
F I G. 6C

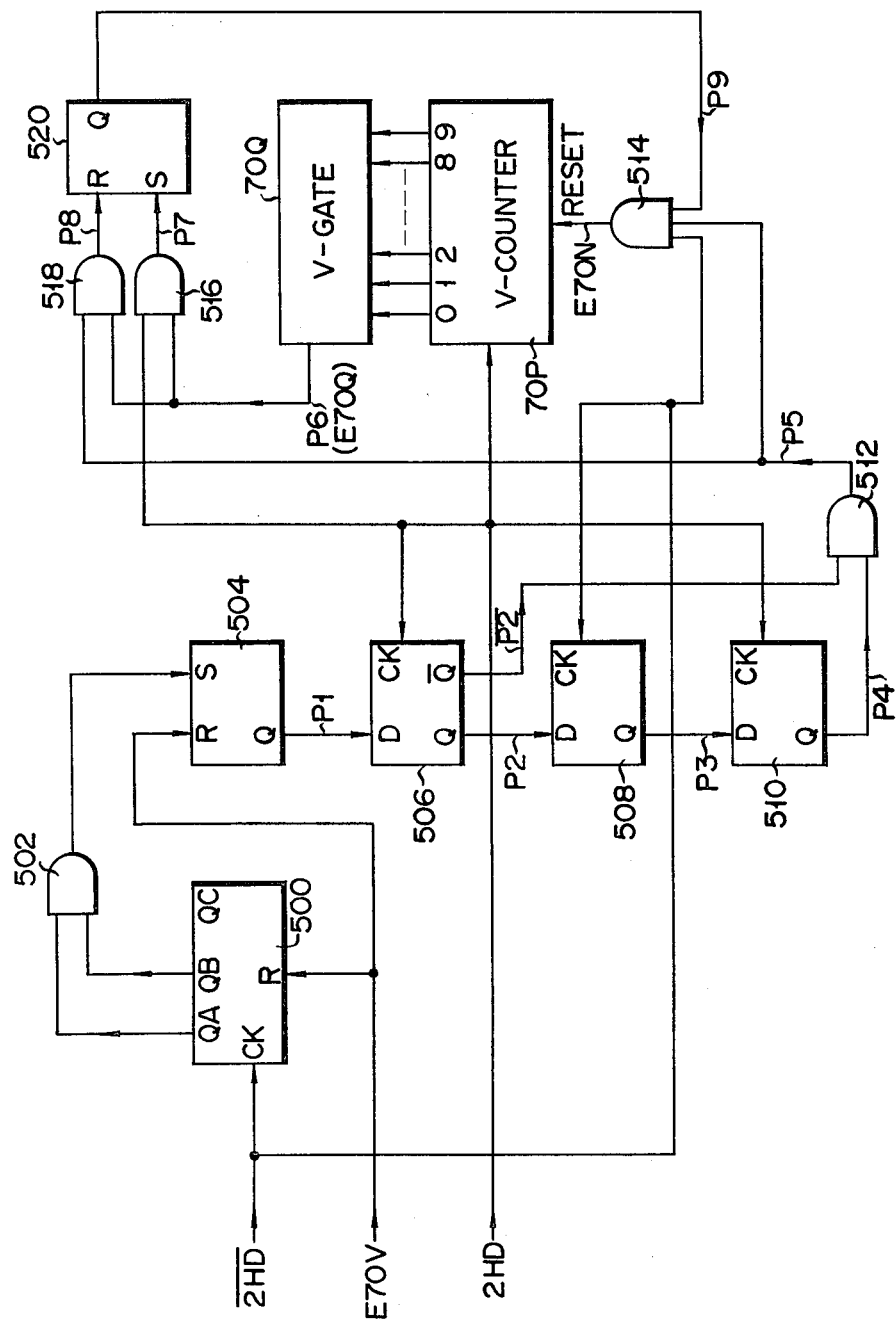
F I G. 6F

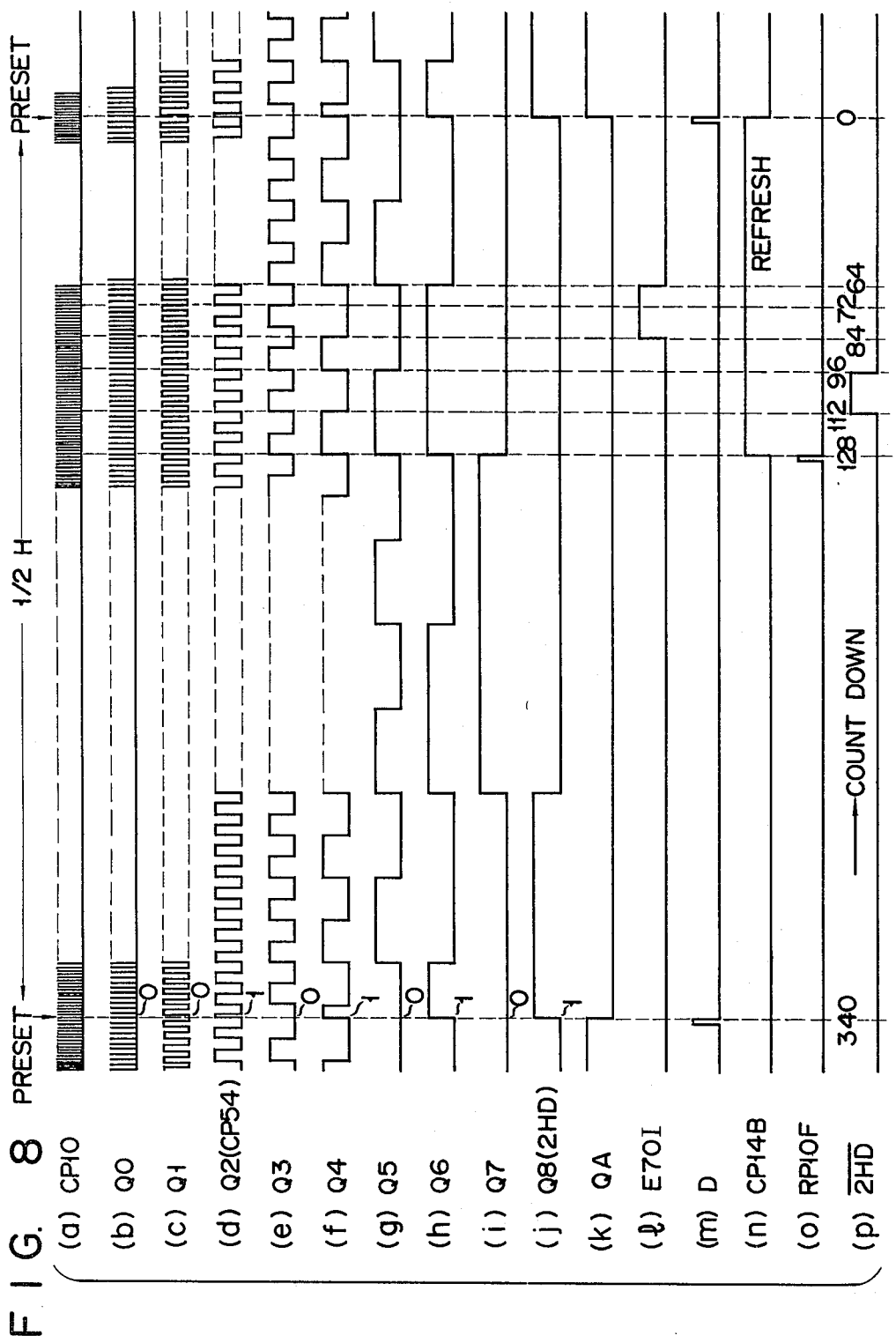

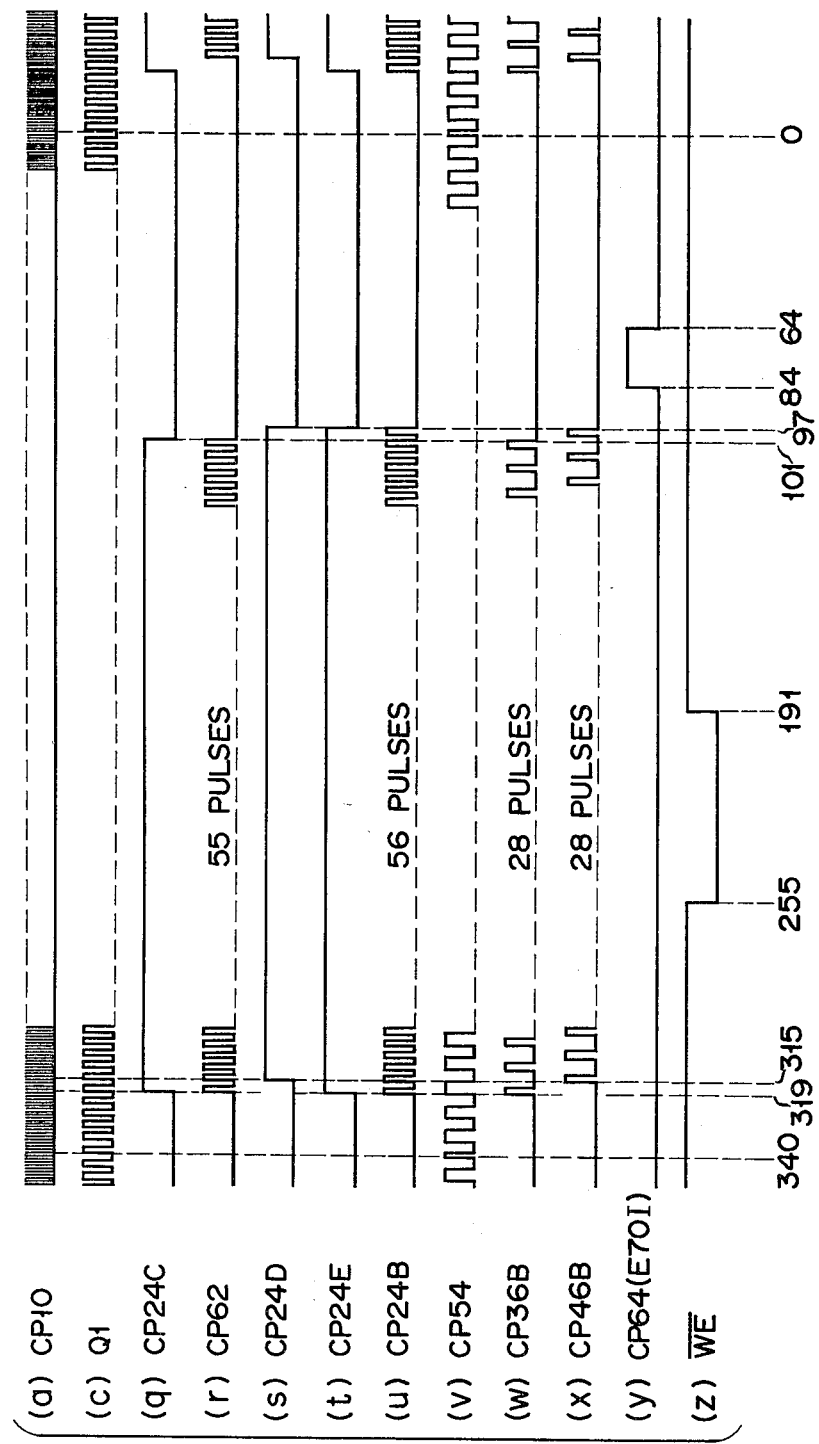

4,483,010

AUTOMATIC EQUALIZER

BACKGROUND OF THE INVENTION

This invention relates to an automatic equalizer utilizing a correlator, which is useful for constituting a ghost canceller or the like.

An apparatus which removes distortion components in electric signals by controlling the tap coefficients of a transversal filter is called an automatic equalizer and is widely used as waveform equalizers and echo cancellers in signal transmission lines. Recently, an attempt is being made to use the automatic equalizer for eliminating ghost or multipath signals in a TV receiver or the like. Such automatic equalizer is discussed in:

Makino et al., "A Novel Automatic Ghost Canceller" IEEE Trans. CE-26,3,p629, Aug. 1980.

The automatic equalizer disclosed in the above literature will have much advantage. Since, however, the correlator of said equalizer is inherently associated with a digital wave integration memory (RAM) and the read/write speed of RAM is generally slower than that of its peripheral circuitries, the operation speed of the automatic equalizer is liable to be restricted to a poor degree due to the slow speed of RAM.

SUMMARY OF THE INVENTION

It is accordingly the object of the present invention to provide a correlator implemented type automatic equalizer having an improved operation.

Another object of the present invention is to simplify the circuit configuration of the correlator thereby to provide an automatic equalizer suitable for circuit integrations.

To achieve the above object, an automatic equalizer of the invention includes at least two wave memories (RAM). These wave memories jointly constitute a wave integration memory for storing amplitude information of an input signal. The wave form of an input signal to be equalized is divided into fragments along time base, and the amplitude components (analog) of respective fragments are sequentially converted to digital forms in a manner that these fragmentary digital components are alternatively distributed to respective wave memories. For instance, the digital components of odd number fragments are stored in one wave memory, and the digital components of even number fragments are stored in the other wave memory. In this case, the read/write speed of each wave memory may be half of the read/write speed of a prior art wave integration memory which should store all fragments of the digital components.

The fragmentary digital components corresponding to the input signal wave form are divided into at least two groups, e.g. an odd group and an even group. Although a correlator of the automatic equalizer generally needs a specially provided differentiator, since the differentiation operation can, with the correlation operation, be carried out by subtracting one fragmentary component of even group from that of odd group, such a special differentiator may be omitted. Therefore, according to the present invention, it is possible to simplify the configuration of the correlator.

BRIEF DESCRIPTION OF THE DRAWINGS

FIG. 1A is one embodiment of a polarity latch 64 shown in FIG. 1;

FIG. 1B is an improved modification of first and second wave memory circuits 30–48 shown in FIG. 1;

FIG. 6C is one embodiment of a gate circuit for generating pulses CP24A, CP32, CP36, CP42 and CP46;

FIG. 6F is an improved modification of a periphral circuitry of a V-counter 70P shown in FIG. 6;

FIGS. 7 and 8 are timing charts illustrating the operation of the H-counter 70H and H-gate 70I;

DETAILED DESCRIPTION OF THE PREFERRED EMBODIMENT

Description is now given with reference to the accompanying drawings of an automatic equalizer embodying this invention.

Figure 1:
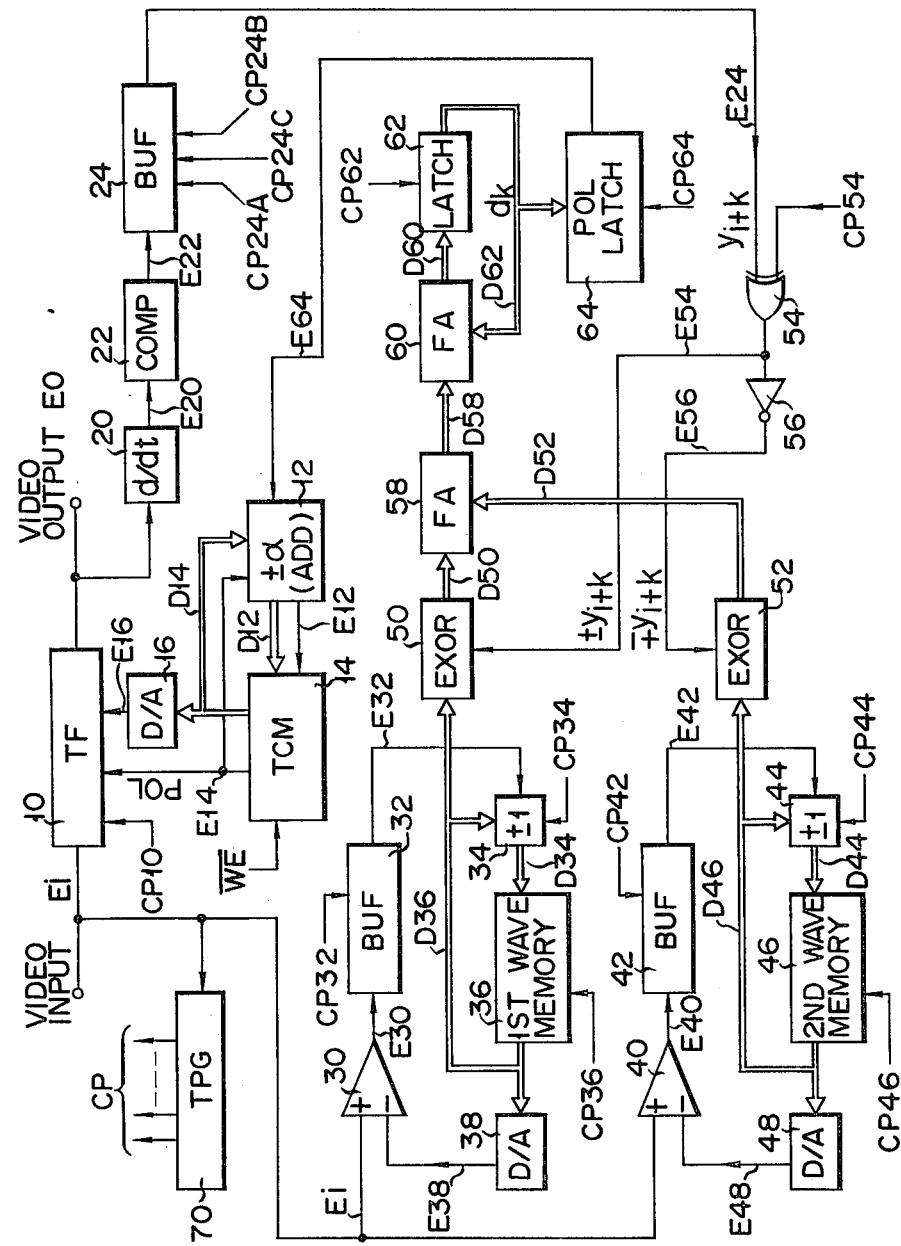
FIG. 1 shows a schematic diagram of an automatic equalizer according to the present invention.

Referring now to FIG. 1 there is shown an automatic equalizer according to the present invention. Here, the explanation will be given to the case where the equalizer of FIG. 1 is applied to a ghost canceller of a TV receiver.

A video input Ei, e.g. an NTSC type color video signal, is inputted to a transversal filter 10. Filter 10 transfers the input Ei with given tap coefficients and outputs a video output Eo. Filter 10 may be a CCD analog delay line with 128 taps. The frequency of a clock pulse CP10 for clocking filter 10 should be double or more the maximum frequency of input Ei from the Nyquist's sampling theorem, that is, pulse CP10 should be 9 MHz or more since input Ei will contain the frequency component of 4.5 MHz. Here, the frequency of $3f_{sc} \approx 10.7$ MHz is used for pulse CP10 ($f_{sc} \approx 3.58$ MHz is the frequency of a color subcarrier). The use of an integral frequency of $f_{sc}$ is advantageous that a beat interference between the sampling frequency of pulse CP10 and the color subcarrier frequency $f_{sc}$ can be avoided. Further, since the frequency $f_{sc}$ is obtained from an APFC (Automatic Phase Frequency Controller) utilizing a crystal oscillator, where pulse CP10 is derived from $f_{sc}$, then pulse CP10 is little affected by ghost signals or noises. Accordingly, in a ghost canceller, $3f_{sc}$ or $4f_{sc}$ is preferable to the sampling clock CP10. The delay time per one tap in transversal filter 10 is about 93ns ($\frac{1}{3}f_{sc}=1/10.7$ MHz), thus about 12 μs of delay time will be obtained through 128 taps. Therefore, it is possible to cancel in filter 10 ghost components within the time delay of 12 μs.

Each of tap coefficients of the filter 10 is determined by a weighting signal E16 and polarity thereof is designated by a polarity signal E14. Signals E14 and E16 are obtained from a tap coefficient memory (TCM) 14 and a digital to analog (D/A) converter 16, respectively. Converter 16 converts a digital output D14 obtained from TCM 14 into signal E16 (analog). Signal E14 and output D14 are applied to an adder 12 which adds a given constant ($+\alpha$ or $-\alpha$) to output D14 according to a tap coefficient control signal E64. How to obtain signal E64 will be described latter. Adder 12 supplies TCM 14 with a digital output D12 and a sign signal E12. Output D12 corresponds to the digital sum of output D14 and the given constant ($\pm\alpha$), and signal E12 indicates the sign of output D12. The contents of TCM 14 is renewed by a write enable pulse $\overline{WE}$ according to output D12 and signal E12. Namely, the tap coefficients of filter 10 can be changed every time pulse $\overline{WE}$ is inputted to TCM 14. In this embodiment, the repetition period of pulse $\overline{WE}$ is the same as the horizontal scanning period of a TV signal.

The components 10 to 16 form a transversal filter circuit for equalizing or ghost-cancelling the video input Ei according to the tap coefficient control signal E64 to provide the equalized video output Eo.

The video output Eo derived from transversal filter 10 is inputted to a differentiator 20. Differentiator 20 differentiates output Eo and provides a differentiated signal E20 indicating a rate of change of the output Eo amplitude to time. Signal E20 is inputted to a comparator 22. Comparator 22 compares signal E20 with a given reference level and provides a digital signal E22 which indicates the porality of differentiated signal E20. Signal E22 is loaded into a buffer 24 by a loading pulse CP24A (10.7 MHz). By such loading, buffer 24 memorizes specific positions of the wave form of output Eo as well as their polarity (sign). To be concrete, the signal edge of vertical synchronization pulse and ghost components corresponding to this signal edge are sequentially converted to signals E22, and these signals E22 are loaded into buffer 24. After this loading, buffer 24 sequentially outputs the loaded contents as a sign signal E24 according to reading out pulses CP24B (2.68 MHz) and CP24C (48.7 kHz). When signal E24 is represented by "$y_{i+k}$", the parameter "i" is changed by pulse CP24B, and the parameter "k" is changed by pulse CP24C.

The components 20 to 24 are used as a sign circuit for generating from the video output Eo the sign signal E24 or $y_{i+k}$ according to the pulses CP24A to CP24C. The signal E24 represents the sign ($\pm$) of a rate of change (d/dt) of output Eo.

The video input Ei is applied to the positive input of an analog comparator 30. Comparator 30 receives its negative input a signal E38 and compares input Ei with signal E38 to provide a digital comparison result E30. The logical level of result E30 is "1" when Ei>E38 and is "0" when Ei<E38. Result E30 is loaded into a buffer 32 by a loading pulse CP32. Buffer 32 may be a shift register. Each of stored contents of buffer 32 is sequentially read out of buffer 32 as a signal E32 by pulse CP32. Signal E32 is applied to an adder 34. Adder 34 receives a first wave signal D36 (digital data) and adds $+1$ or $-1$ to signal D36 according to the logical level of signal E32, then adder 34 outputs an added result D34 (digital). The contents of result D34 is changed by $\pm1$ from the contents of signal D36. Result D34 is loaded into a first wave memory 36 by a timing pulse CP36. At the time of data writing, the clock timing of pulse CP36 may be the same as that of pulse CP32. Memory 36 outputs the signal D36. Signal D36 is converted by a D/A converter 38 into said signal E38.

Incidentally, the adding operation at adder 34 is controlled by an operation enabling pulse CP34. That is, adder 34 adds $+1$ or $-1$ to signal D36 according to signal E32 only when pulse CP34 enables such addition.

The video input Ei is applied to the positive input of an analog comparator 40. Comparator 40 receives its negative input a signal E48 and compares input Ei with signal E48 to provide a digital comparison result E40. The logical level of result E40 is "1" when Ei>E48 and is "0" when Ei<E48. Result E40 is loaded into a buffer 42 by a loading pulse CP42. Buffer 42 may be a shift register. Each of the stored contents of buffer 42 is sequentially read out of buffer 42 as a signal E42 by pulse CP42. Signal E42 is applied to an adder 44. Added 44 receives a second wave signal D46 (digital data) and adds $+1$ or $-1$ to signal D46 according to the logical level of signal E42, then adder 44 outputs an added result D44 (digital). The contents or result D44 is changed by $\pm1$ from the contents of signal D46. Result D44 is loaded into a second wave memory 46 by a timing pulse CP46. At the time of data writing, the clock timing of pulse CP46 may be the same as that of pulse CP42. Memory 46 outputs the signal D46. Signal D46 is converted by a D/A converter 48 into said signal E48.

Incidentally, the adding operation at adder 44 is controlled by an operation enabling pulse CP44. That is, adder 44 adds $+1$ or $-1$ to signal D46 according to signal E42 only when pulse CP44 enables such addition.

The wave form of the video input Ei is divided into fragments along time base in accordance with the timing pulse CP36, and the amplitude components of respective fragments are sequentially stored in the first wave memory 36. Similarly, the wave form of input Ei is divided into other fragments according to the pulse CP46, and the amplitude components of these fragments are stored in the second wave memory 46. Where the frequency of pulse CP24A applied to the buffer 24 is 10.7 MHz, then each frequency of pulses CP36 and CP46 used in the embodiment is 5.35 Mz ($=10.7$ MHz/2), and pulse CP46 differs from pulse CP36 by $\pi$ in phase. In this case, for instance, the fragments of odd numbers of pulse CP24A (positive periods of pulse CP36) are stored in memory 36, and the fragments of even numbers of pulse CP24A (negative period of CP36 or positive period of CP46) are stored in memory 46. In other words, the fragmentary amplitude components of input Ei are alternatively distributed to the pair of memories 36 and 46.

The components 30 to 38 form a first wave memory circuit for storing amplitude information of the input signal Ei according to the timing pulse CP36, and the components 40 to 48 form a second wave memory circuit for storing amplitude information of the signal Ei according to the pulse CP46. The first and second wave memory circuits jointly constitute a wave integration memory of the ghost canceller.

The first wave signal D36 is inputted to a first EX OR circuit 50, and the second wave signal D46 is inputted to a second EX OR circuit 52. Each of circuits 50 and 52 is formed of a plurality of exclusive OR gates parallel arranged. First and second EX OR circuits 50 and 52 also receive first and second sign signals E54 and E56, then circuits 50 and 52 output gated signals D50 and D52, respectively. Signal E54 is obtained from an EX OR gate 54, and signal E56 is made by inverting the phase of signal E54 via an inverter 56. EX OR gate 54 receives at one input terminal said sign signal E24 (2.68 MHz) or $y_{i+k}$ and at the other input terminal an inverting clock pulse CP54 (1.34 MHz). Where E24= $+y_{i+k}$ and CP54=logical "0", then E54= $+y_{i+k}$ and E56= $-y_{i+k}$. Where E24= $+y_{i+k}$ and CP54=logical "1", then E54= $-y_{i+k}$ and E56= $+y_{i+k}$. Where CP54=logical "0", E24= $y_{i+k}$, E54="1" and E56="0", then the EX OR circuits 50 and 52 function as inverted and noninverted sign converters, respectively. Thus, the output signal D50 of EX OR circuit 50 is $-D36y_{i+k}$ and the output signal D52 of EX OR circuit 52 is $+D46y_{i+k}$. Where CP54=logical "1", E24= $y_{i+k}$, E54="0" and E56="1", then D50= $+D36y_{i+k}$ and D52= $-D46y_{i+k}$.

The signals D50 and D52 are both applied to a full adder 58 which already receives binary data "1" for two's complement. Adder 58 adds signal D50 to signal D52 or vice versa to provide an added result D58. Accordingly, D58=D50+D52= $+D36y_{i+k}-D46y_{i+k}=(+D36-D46)y_{i+k}$ when CP54=logical "1". Similarly, D58= $-D36y_{i+k}+D46y_{i+k}=(-D36+D46)y_{i+k}$ when CP54=logical "0".

As mentioned earlier, respective signals D36 and D46 are divided into fragments, e.g. into i fragments. Where the amplitude component of each fragment is denoted as $Z_i$, then signals D36 and D46 may respectively be represented by $Z_{i-1}$ and $Z_i$ wherein the phase (sign) difference between "i−1" component and "i" component corresponds to the phase difference of 180° formed between CP36 and CP46. Thus, said added result D58 may be expressed as:

$$D58 \bigg|_{CP54 = 1} = (+Z_{i-1} - Z_i)y_{i+k} \quad (1A)$$

$$D58 \bigg|_{CP54 = 0} = (-Z_{i-1} + Z_i)y_{i+k} \quad (1B)$$

or $$D58 \bigg|_{CP54 = 1 \text{ or } 0} = (Z_{i-1} - Z_i)(\pm y_{i+k}) = (Z_{i-1} - Z_i) \cdot sgn(y_{i+k}) \quad (1)$$

Equation (1) suggests that the result D58 is equivalent to differentiated result of amplitude component $Z_i$ stored in the first and second wave memories 36 and 46. In other words, by subtracting one fragmentary component ($Z_i$) of memory 46 from that ($Z_{1-1}$) of memory 36, where these two fragmentary components are adjacent each other, differentiating operation for the wave form of input signal Ei can actually be performed without a special differentiation circuit. Thus, the circuit of components 50 to 58 has a differentiation function.

The components 50 to 58 form a process circuit for multiplying the difference ($Z_{i-1}-Z_i$) between the wave signals D36 and D46 by the sign signal E24($y_{i+k}$)

The added result D58 is applied to a full adder 60. Adder 60 receives an accumulated result D62 and adds the result D58 to this result D62 to provide an added output D60. Output D60 is loaded into a latch 62 according to a correlation control signal CP62. The loaded contents of latch 62 is the accumulated result D62 which represents a correlation data $d_k$ (digital). The most significant bit (MSB) of data $d_k$ is applied to a polarity latch 64. Latch 64 latches or stores the polarity (sign) of data $d_k$ when an enabling pulse CP64 is applied. Latch 64 outputs said tap coefficient control signal E64 whose logical level indicates the polarity of data $d_k$. Latch 64 may be formed of a D type flip-flop 64 as shown in FIG. 1A.

The components 50 to 64 are used as a correlator circuit for correlating the sign signal E24($y_{i+k}$) with the first and second wave signals D36 and D46 according to the correlation control signal CP62.

Assume here that the difference $Z_{i-1}-Z_i$ is $x_i$ and the accumulation times at the correlator circuit (50–64) are m. In this case, $$d_k = \sum_{i=1}^{m} x_i sgn(y_{i+k}) \quad (2)$$

is obtained. Where the Kth tap coefficient of the transversal filter 10 is $C_K$ and the result of N time correlation for the coefficient $C_K$ is $C_K^N$, then the N+1 time correlation result $C_K^{N+1}$ is $$C_K^{N+1} = C_K^N - \alpha \cdot sgn(d_k) \quad (3)$$

where α is a given positive constant of the adder 12. When the ghost component is eliminated, the parameters $y_{i+k}$ and $d_k$ become zero. At this time, the tap coefficient $C_K^N$ is converged to the stable state of $C_K^{N+1}=C_K^N$ as seen from equation (3), and $d_k$ is minutely vibrated around the zero level. In the present embodiment, the constant α is selected to the value of "1", for example.

The whole operation timing of the ghost canceller is governed by a timing pulse generator 70. That is, generator 70 generates the pulses CP10–CP64, etc. with a given timing according to synchronizing signals contained in the video input Ei so that the operation of the ghost canceller is regulated.

FIG. 1B is an improved modification of the first and second wave memory circuits (30–48) shown in FIG. 1.

The video input Ei is applied to the positive input of an analog comparator 30. Comparator 30 receives its negative input a signal E38 and compares input Ei with signal E38 to provide a digital comparison result E30. The logical level of result E30 is "1" when Ei>E38 and is "0" when Ei<E38. Result E30 is loaded into a buffer 32 by a timing pulse CP36. Buffer 32 may be a shift register. Each of stored contents of buffer 32 is sequentially read out of buffer 32 as a signal E32 by pulse CP36. Signal E32 is applied to an adder 34. Adder 34 receives a first wave signal D36 (digital data) and adds +1 or −1 to signal D36 according to the logical level of signal E32, then adder 34 outputs an added result D34 (digital). The adding operation at adder 34 is controlled by an enabling pulse CP34. Adder 34 adds +1 or −1 to signal D36 according to signal E32 only when pulse CP34 enables such addition. The contents of result D34 is changed by ±1 from the contents of signal D36. Result D34 is loaded into a first wave memory 36 by timing pulse CP36.

The result E30 is also loaded into a buffer 42 by a timing pulse CP46. Buffer 42 may be a shift register. Each of the stored contents of buffer 42 is sequentially read out of buffer 42 as a signal E42 by pulse CP46. Signal E42 is applied to an adder 44. Adder 44 receives a second wave signal D46 (digital data) and adds +1 or −1 to signal D46 according to the logical level of signal E42, then adder 44 outputs an added result D44 (digital). The adding operation at adder 44 is controlled by an enabling pulse CP34. Adder 44 adds +1 or −1 to signal D46 according to signal E42 only when pulse CP34 enables such addition. The contents of result D44 is changed by ±1 from the contents of signal D46. Result D44 is loaded into a second wave memory 46 by timing pulse CP46. Memory 36 and 46 respectively supply with the signals D36 and D46 to a multiplexer 37. Multiplexer 37 combines signal D36 with signal D46 to provide a wave integration signal D37 corresponding to the both contents of memories 36 and 46. Signal D37 is converted by a D/A converter 38 into said signal E38.

The circuit of FIG. 1B has substantially the same wave integrating function as the first and second wave memory circuits shown in FIG. 1.

Figure 2:
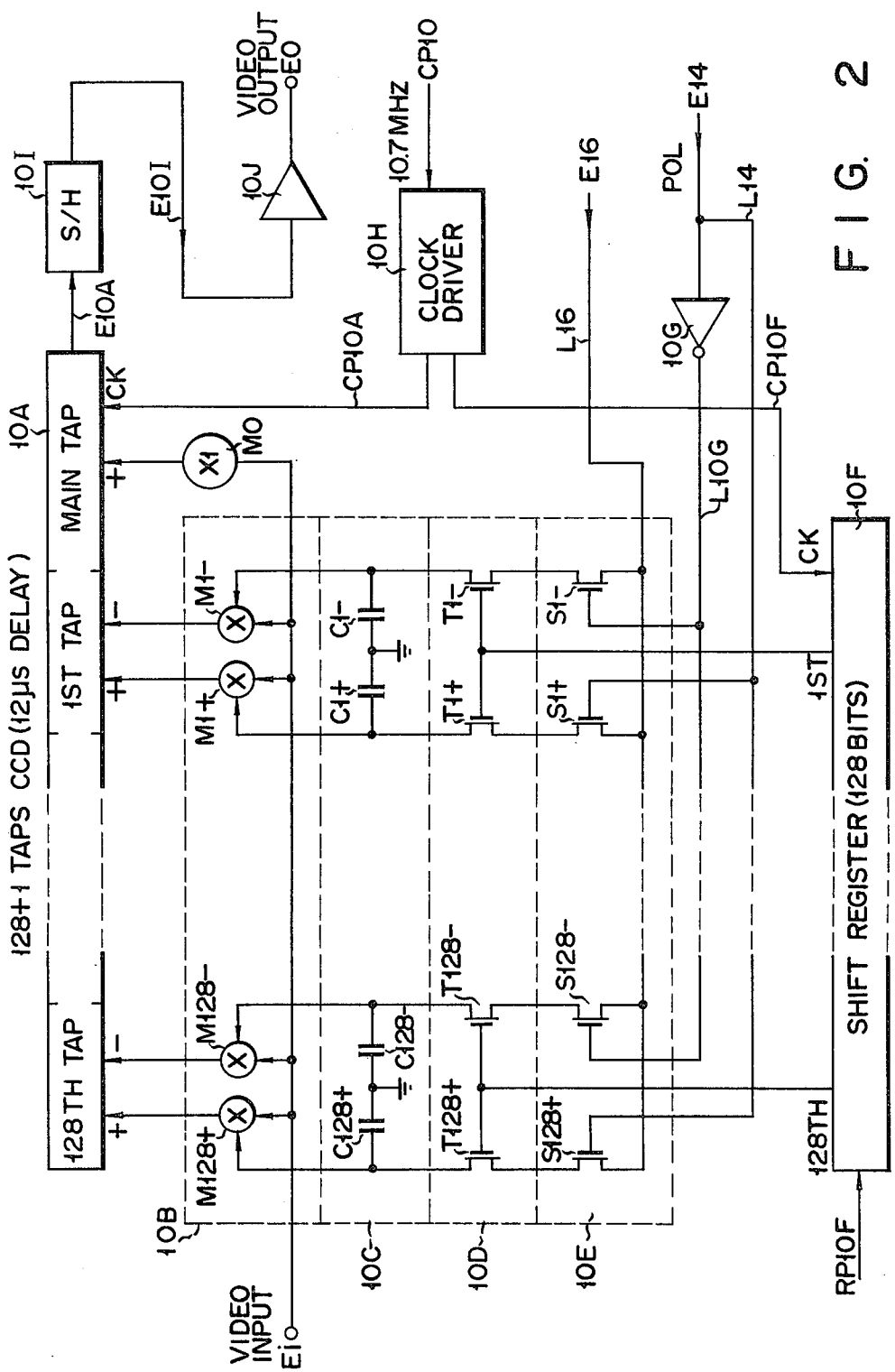
FIG. 2 is one embodiment of a transversal filter 10 shown in FIG. 1.

FIG. 2 shows a detailed configuration of one embodiment of the transversal filter 10. The video input Ei is applied via a pad M0 to the positive input of the main tap of an analog delay line 10A. Line 10A may be a Charge-Coupled Device (CCD) 10A having 128 taps and one main tap. Input Ei is also applied to each multiplicand input of analog multipliers M1+− to M128+−. These multipliers jointly form a weighting circuit 10B. The outputs of multipliers M1+ and M1− are coupled to the positive and negative inputs of the first tap of CCD 10A, respectively. Similarly, the respective positive/negative outputs of multipliers M2+− to M128+− are coupled to the respective positive/negative inputs of 2nd to 128th taps of CCD 10A.

CCD 10A receives a shifting clock pulse CP10A outputted from a clock driver 10H. Driver 10H generates pulse CP10A of 10.7 MHz according to the clock pulse CP10. CCD 10A transfers each output of weighting circuit 10B with the clock timing of pulse CP10A. Since CP10A≃10.7 MHz and CCD 10A has 128 taps for delaying the outputs of circuit 10B, CCD 10A permits to transfer the outputs of circuit 10B with about 12 μs (≃128/10.7 MHz) delay at maximum. A delayed output E10A of CCD 10A is applied to a sample/hold circuit 10I. Circuit 10I converts the fragmentary output E10A into an analog signal E10I. Signal E10I is inputted to a buffer amplifier 10J and amplifier 10J outputs the video output Eo.

The multipliers M1+− to M128+− are coupled to the respective ends of capacitors C1+− to C128+−. The other end of each of capacitors C1+− to C128+− is grounded. Capacitors C1+− to C128+− form a weighting memory circuit 10C. The multipliers or coefficients of multipliers M1+− are respectively determined by the charged voltages of capacitors C1+−. Similarly, the multipliers of respective multipliers M2+− to M128+− depend on the respective charged voltages of capacitors C2+− to C128+−.

One end of capacitor C1− is coupled to a signal line L16 via the drain-source path of a MOS transfer gate transistor T1− and the drain-source path of a MOS switch transistor S1−. Line L16 is coupled to the D/A converter 16 of FIG. 1 and transmits analog information of signal E16. One end of capacitor C1+ is coupled to line L16 via the drain-source path of a MOS transfer gate transistor T1+ and the drain-source path of a MOS switch transistor S1+. Similarly, each end of capacitors C2− to C128− is coupled to line L16 via each series circuit of transistors T2−, S2− to transistors T128−, S128−. Each end of capacitors C2+ to C128+ is coupled to line L16 via each series circuits of transistors T2+, S2+ to transistors T128+, S128+.

The transistors T1+− to T128+− form a transfer gate circuit 10D, and the transistors S1+− to S128+− form a weighing polarity selection circuit 10E. Circuit 10E selectively couples line L16 to circuit 10D according to the logical level of signal E14. Circuit 10D transfers a signal level of signal E16 passing through the selected one of transistors S1+− to S128+− to the corresponding one of capacitors C1+− to C128+−.

The gates of transistors T1+− are connected to the first bit of a shift register 10F. Similarly, the respective gates of transistors T2+− to T128+− are connected to the 2nd to 128th bits of register 10F. Register 10F receives a refresh start pulse RP10F and a shifting clock pulse CP10F. Register 10F shifts the inputted pulse RP10F from 128th bit side to 1st bit side by pulse CP10F. Pulse RP10F is obtained from the timing pulse generator 70 shown in FIG. 1 and has the same frequency as the horizontal synchronizing signal (15.7 kHz) of TV system. Pulse CP10F is obtained from the driver 10H and has the same frequency as pulse CP10 (10.7 MHz).

The gates of transistors S1+ to S128+ are connected to a signal line L14 to which the polarity signal E14 is applied. The gates of transistors S1− to S128− are connected to an output line L10G. Line L14 is coupled via an inverter 10G to line L10G. Thus, the phase of line L10G is opposite to that of line L14. Accordingly, for instance, logical level "1" of signal E14 renders transistors S1+ to S128+ turned on while transistors S1− to S128− turned off. When signal E14 has logical level "0", transistors S1+ to S128+ are turned off and transistors S1− to S128− are turned on. To be concrete, where signal E14 is logical "1" and the first bit of shift register 10F is logical "1", then transistors T1+− and S1+ to S128+ are turned on, and signal E16 is applied only to capacitor C1+. In this case, the first tap coefficient of CCD 10A is determined by the analog information of "+E16" stored in capacitor C1+. Where E14="0", then the first tap coefficient is determined by "−E16". In this way, the tap coefficient of each tap of CCD 10A is determined by the logical level (polarity) of signal E14 and the magnitude or amplitude of signal E16. A positive distortion components (ghost) contained in input Ei are canceled according to the charged voltages of capacitors C1− to C128−, and a negative distortion components are canceled according to the charged voltages of capacitors C1+ to C128+. To retain the tap coefficient of each tap to a given degree, the charged voltage of each of capacitors C1+− to C128+− is refreshed in synchronism with the shifting operation of register 10F.

Figure 2A:
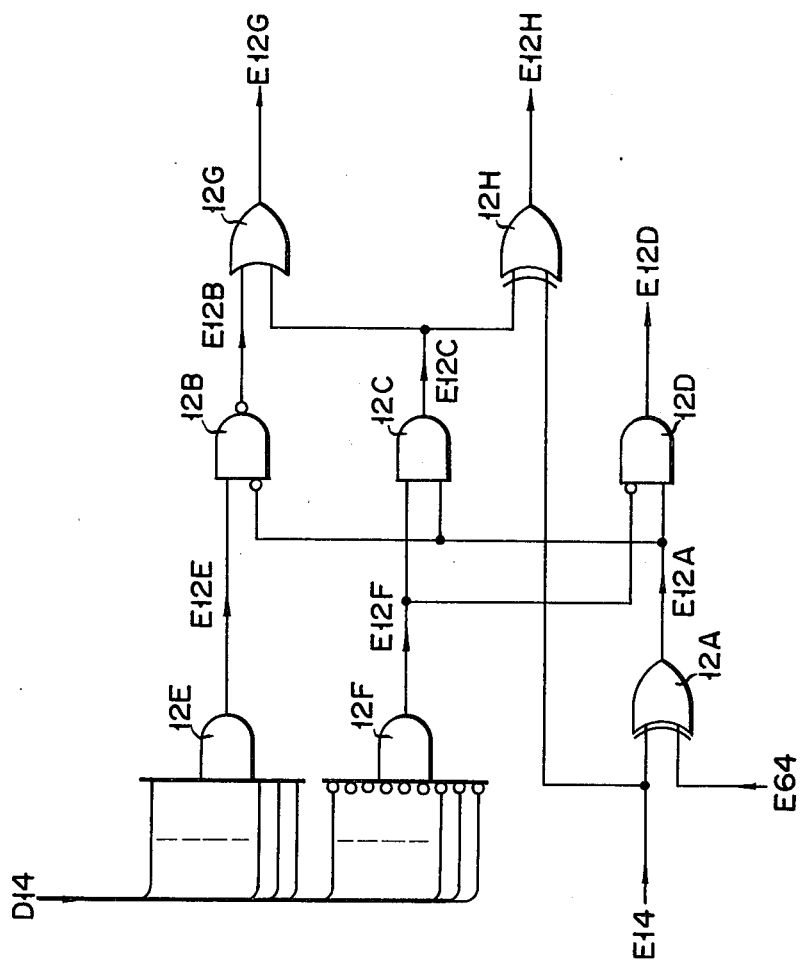
FIGS. 2A and 2B are embodiments of an adder 12 and a tap coefficient memory 14 shown in FIG. 1.
Figure 2B:
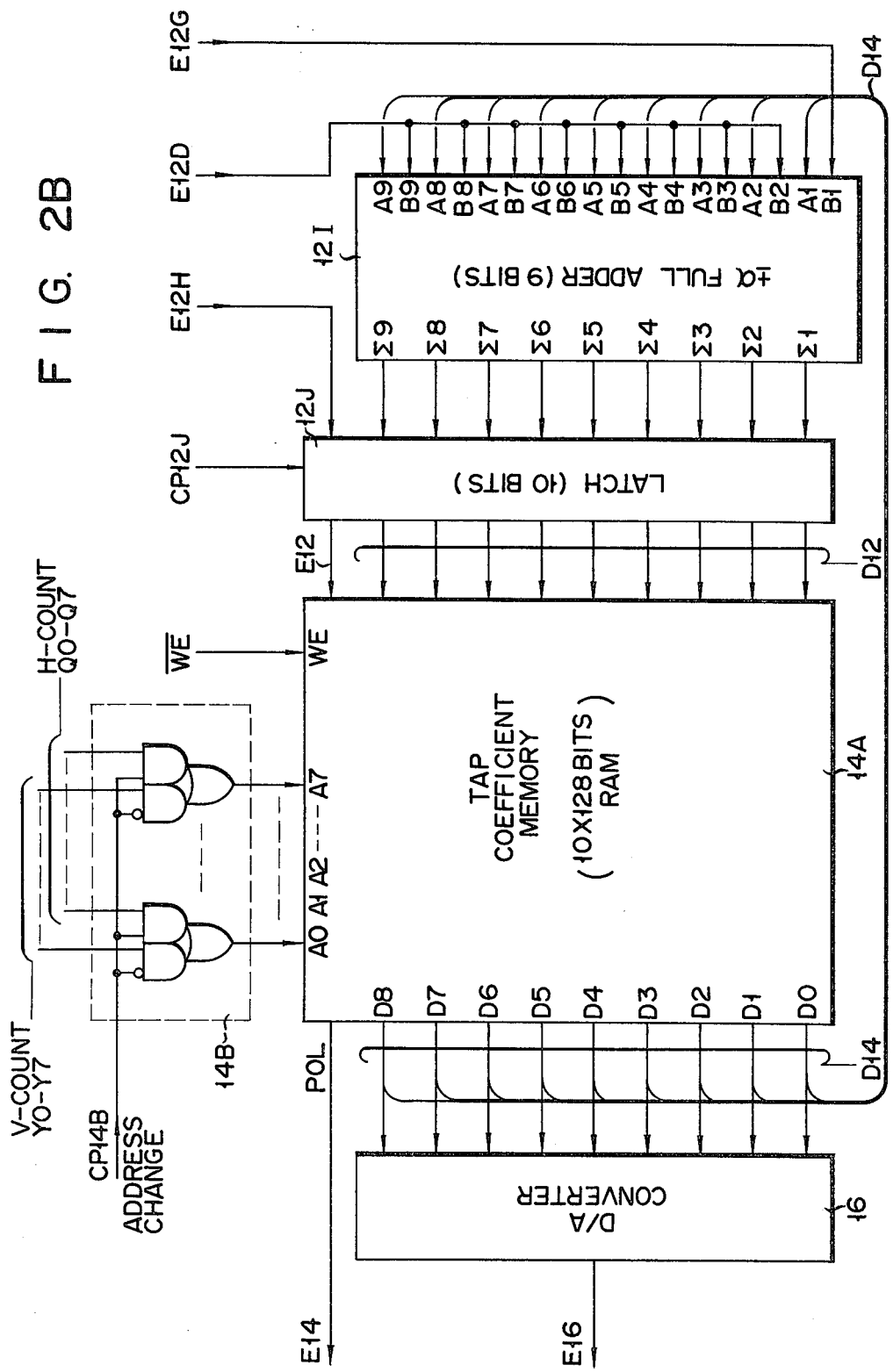

FIGS. 2A and 2B show a detailed configuration of one example of the adder 12 and tap coefficient memory 14 shown in FIG. 1.

In FIG. 2A, the tap coefficient control signal E64 is applied to an input of an EX OR gate 12A. The other input of gate 12A receives the polarity signal E14. An output E12A of gate 12A is applied to an inverted input of a NAND gate 12B as well as each input of AND gates 12C and 12D. The other input of gate 12B receives an output E12E of an AND gate 12E. Gate 12E has nine inputs to which nine-bit digital output D14 is applied. Output D14 is also applied to nine inverted inputs of an AND gate 12F. An output E12F of gate 12F is applied to the other input of gate 12C and to an inverted input of gate 12D. An output E12B of gate 12B is applied to one input of an OR gate 12G. An output E12C of gate 12C is applied to the other input of gate 12G and to one input of an EX OR gate 12H. Gate 12H receives at the other end the polarity signal E14.

An output E12D of the gate 12D (FIG. 2A) is applied to inputs B2 to B9 of a nine-bit full adder 12I (FIG. 2B). An output E12G of gate 12G is inputted to an input B1 of adder 12I. An output E12H of gate 12H is inputted to one bit of a ten-bit latch 12J. Latch 12J receives respective outputs Σ1 to Σ9 of adder 12I. Latch 12J stores output E12H and outputs Σ1 to Σ9 of adder 12I when a loading pulse CP12J is applied. The contents of latch 12J, i.e. the sign signal E12 and digital output D12 are supplied to a memory (RAM) 14A. RAM 14A may be formed of ten parallel arranged 128 bits memory stacks. The address of each 128 bits memory of RAM 14A is designated by outputs A0 to A7 of an address gate 14B. The outputs A0 to A7 are determined by V-counter outputs Y0 to Y7 or by H-counter outputs Q0 to Q7. Detailed for H- and V-counters will be described latter. Which output is used as the output of A0 to A7 is determined by an address change gate pulse CP14B. RAM 14A is permitted to accept inputted data E12 and D12 when the write enable pulse $\overline{WE}$ is applied to a write enable input $\overline{WE}$. That is, when RAM 14A performs the read/write operation, pulse CP14B is logical "0" and the address of RAM 14A is designated by outputs Y0–Y7. When the refreshment for capacitors C1+ − to C128+ − are carried out, pulse CP14B is logical "1" and the address thereof is designated by outputs Q0–Q7.

The circuitry of FIGS. 2A and 2B will operate as follows.

When the logical level of signal E14 is the same as that of signal E64, output E12A of gate 12A is logical "0" and thus output E12D is logical "0". Accordingly, inputs B2 to B9 of adder 12I are all "0". When logical levels of data D0 to D8 corresponding to the output D14 are not all "1", output E12E of gate 12E is "0". Then, output E12B of gate 12B is "1", and signal E12G is "1". From this, input B1 of adder 12I is "1". Where B1 is "1" and B2 through B9 are all "0", then adder 12I adds +α to respective data D0 to D8 of output D14. In this embodiment, +α is selected to +1.

When all logical levels of output D14 are "1", output E12E is logical "1". Where output E12A is "0" and output E12D is "0", then outputs E12B and E12C are both "0", and output E12G is "0". Thus, the logical levels at inputs B1 to B9 are all "0". In this case, adder 12I adds +0 to data D0 through D8, or carries out no addition.

When the logical level of signal E14 is different from that of signal E64, the output E12A is logical "1". When data D0 to D8 of output D14 are not all "0", output E12F of gate 12F is "0", and output E12C is "0". Since E12A="1" and E12F="0", the logical level of output E12D is "1". Since E12A="1", the logical level of output E12B is "1", and thus E12G="1". Accordingly, the logical levels at the inputs B1 to B9 of adder 12I are all "1". In this case, adder 12I adds −α to data D0 through D8, and the logical level of signal E12H is the same as that of polarity signal E14 for E12C="0".

When data D0 to D8 are all "0", output E12F is "1". Where E12F="1" and E12A="1", then E12C="1" and E12G="1". In this case, EX OR gate 12H functions as an inverter. That is, gate 12H inverts the polarity of signal E14. Further, since E12G="1", input B1 of adder 12I is "1", then adder 12I adds +α to data D0 through D8.

Figure 3:
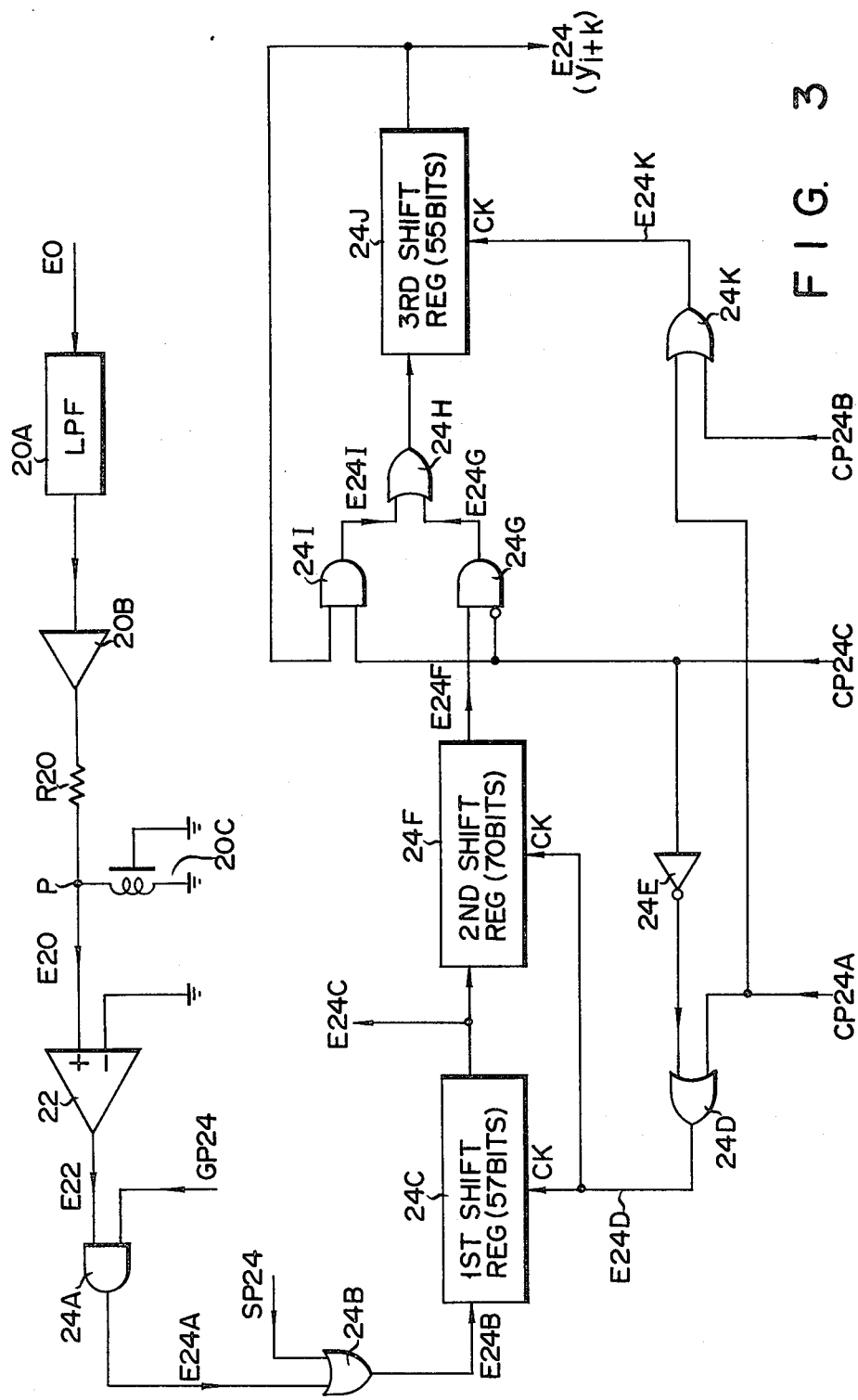
FIG. 3 is one embodiment of a sign circuit 20–24 shown in FIG. 1.

FIG. 3 is one embodiment of a sign circuit (20–24) shown in FIG. 1. The video output Eo is applied via a low-pass filter (LPF) 20A to a buffer amplifier 20B. The output of amplifier 20B is grounded through a series circuit of a resistor R20 and a delay line 20C. The delay time of delay line 20C is 23.4 ns. Delay line 20C absorbs a signal at the juncture point P between resistor R20 and delay line 20C and reflects the absorbed signal at the ground side and feeds back the reflected signal to the point P with time delay of 46.8 ns (=23.4 ns×2). Resistor R20 and delay line (inductor with capacitance) 20C form a differentiator.

A differentiated output E20 is obtained from the point P. Since the time delay of 46.8 ns corresponds to the phase delay of π at 10.7 MHz ($3f_{sc}$), the fed back signal of delay line 20C cancels a subsequent signal of 10.7 MHz at point P. Therefore, the differentiator has null points at 10.7 MHz and its integer multiplied frequencies. This is advantageous that the sign circuit and its following circuitries are little affected by the system clock noise of 10.7 MHz and its harmonics components contained in the video output Eo. The output E20 has a substantive positive or negative potential when the level of video output Eo is changed.

The output E20 is applied to the positive input of comparator 22. The negative input of comparator 22 is grounded. Thus, the comparison level of comparator 22 is the ground level or zero potential. Comparator 22 outputs a comparison result E22. The logical level of result E22 is "1" when output E20 has a positive potential. Where output E20 is negative, then result E22 is "0". Result E22 is applied to one input of an AND gate 24A. The other input of gate 24A receives a gate pulse GP24. Gate 24A permits result E22 to pass therethrough when pulse GP24 is logical "1". An output E24A of gate 24A is applied to one input of an OR gate 24B. The other input of gate 24B receives a start pulse SP24 whose logical level is temporarily "1" at the time when the data reading or data storing is commenced. An output E24B of gate 24B is inputted to a first shift register (SR) 24C having a capacity of 57 bits.

The loading pulse CP24A is applied to respective inputs of OR gates 24D and 24K. Gate 24K receives at the other input the loading pulse CP24B and outputs a shifting clock pulse E24K. The loading pulse CP24C is applied via an inverter 24E to the other input of gate 24D. Gate 24D outputs a shifting clock pulse E24D. Pulse E24D clocks the SR 24C to shift the inputted data of output E24B.

After clocking of 57 bits is carried out, the SR 24C outputs a first shifted pulse E24C. Pulse E24C is inputted to a second SR 24F having 70 bits. SR 24F is clocked by pulse E24D. When the shift of 70 bits is completed, SR 24F outputs a second shifted pulse E24F. Pulse E24F is inputted to an AND gate 24G. An inverted input of gate 24G receives the pulse CP24C. An output E24G of gate 24G is supplied via one input of an OR gate 24H to a third SR 24J having 55 bits. SR 24J is clocked by the pulse E24K and outputs the sign signal $E24(y_{i+k})$ after the completion of 55 bits shifting. Signal E24 is applied to one input of an AND gate 24I which receives at the other input the pulse CP24C. An output E24I of gate 24I is also supplied via the other input of gate 24H to SR 24J.

The operation of FIG. 3 configuration will be described latter.

The circuitry as to the SR 24C, 24F and 24J may be "SHIFT REGISTER CONTROL DEVICE" of the Japanese Utility Model Application No. 54-126698 filed by the same assignee (TOSHIBA CO.) as the present application. This Japanese application corresponds to the Public Utility Model Disclosure No. 56-46100 which was laid open on Apr. 24, 1981. The disclosure of this Utility Model Application is now combined herewith.

Figure 4:
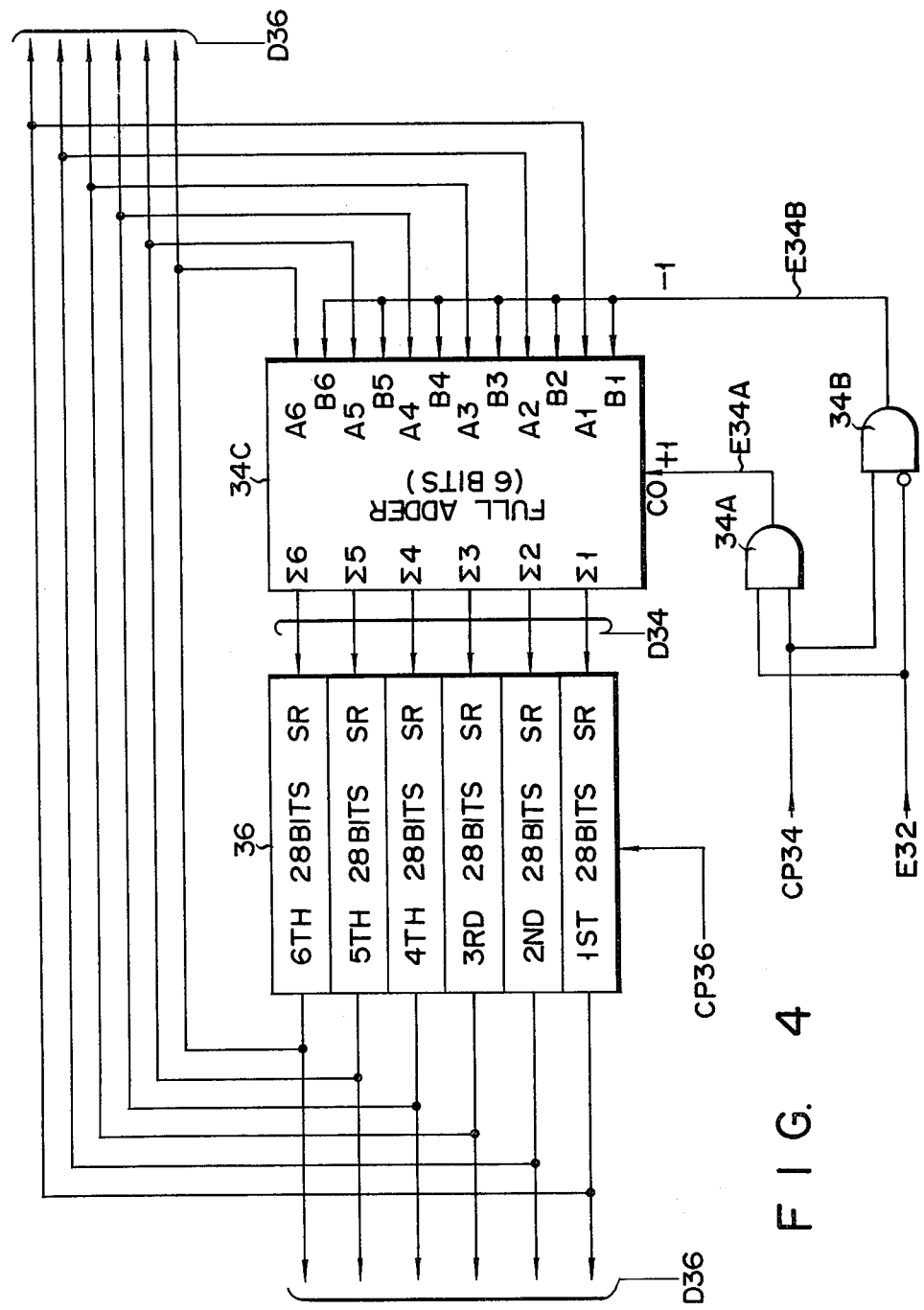
FIG. 4 is one embodiment of an adder 34 and a wave memory 36 shown in FIG. 1.

FIG. 4 is one embodiment of adder 34 and first wave memory 36 shown in FIG. 1 or 1B. The configuration of adder 44 and wave memory 46 may be the same as that shown in FIG. 4.

The signal E32 obtained from buffer 32 is inputted to one input of an AND gate 34A as well as an inverted input of an AND gate 34B. The other input of each of gates 34A and 34B receives the enabling pulse CP34. An output E34A of gate 34A is applied to a carry out input CO of a 6-bit full adder 34C. An output E34B of gate 34B is applied to each of inputs B1 to B6 of adder 34C. Adder 34C receives the wave signal D36 at its each of inputs A1 to A6. Outputs Σ1 to Σ6 of adder 34C, or the added result D36, are inputted to respective 28-bit shift registers of memory 36. Each shift register of memory 36 shifts the inputted data according to the clocking of timing pulse CP36.

The circuitry of FIG. 4 will operate as follows.

When the enabling pulse CP34 is logical "0", the logical levels of outputs E34A and E34B are both "0", and adder 34C adds +0 to signal D36 or performs no addition. Thus, the wave signal D36 is circulated among adder 34C and memory 36 without change of its contents.

Where the pulse CP34 is logical "1", then adder 34C adds +1 or −1 to signal D36 according to the logical level of signal E32.

When CP34="1" and E32="1", output E34A="1" and output E34B="0". In this case, adder 34C adds +1 to signal D36, and contents of each of outputs Σ1 to Σ6 are incremented by "+1" when the circulation of signal D36 is carried out.

When CP34="1" and E32="0", output E34A="0" and output E34B="1". In this case, adder 34C adds "−1" to signal D36, and contents of each added result D34 are incremented by "−1", or decremented by "+1", with each circulation of signal D36.

Where the configuration of adder 44 and second wave memory 46 are the same as that shown in FIG. 4, then the data circulation of signal D46 will also be performed as just mentioned above except that the phase of pulse CP46 is opposite to that of pulse CP36. Incidentally, the above-mentioned circulation of signal D36 (D46) is performed in synchronism with the horizontal sychronization signal of TV system.

Figure 5:
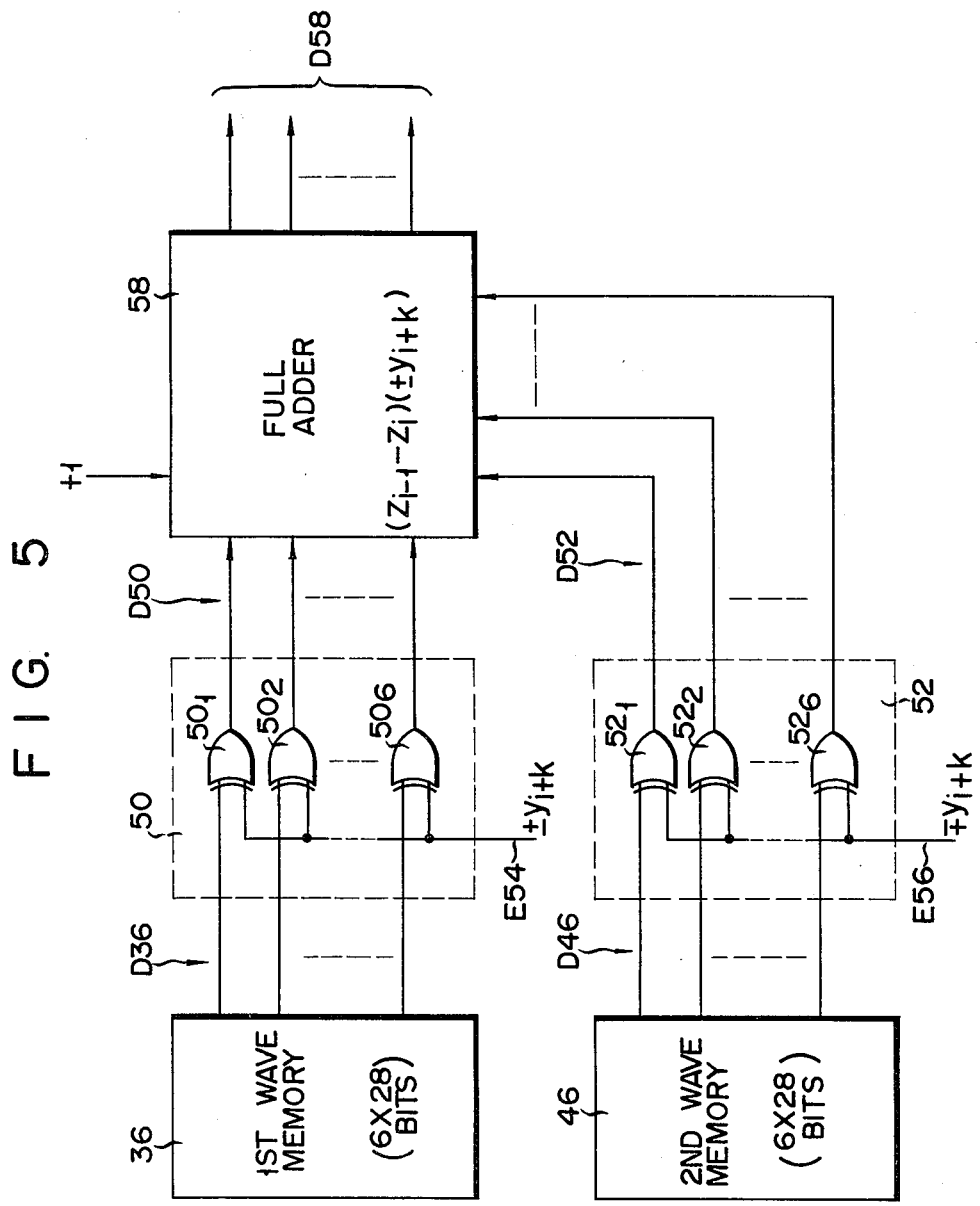
FIG. 5 is one embodiment of EX OR circuits 50 and 52 shown in FIG. 1.

FIG. 5 is an embodiment of EX OR circuits 50 and 52 shown in FIG. 1.

The 6-bit signal D36 of first wave memory 36 is applied to each input of EX OR gates $50_1$ to $50_6$ of circuit 50. The other input of each of gates $50_1$–$50_6$ receives the first signal E54($\pm y_{i+k}$). When E54="0" ($+y_{i+k}$), gates $50_1$–$50_6$ make signal D36 straight passed therethrough and output a gated signal D50 (=D36($y_{i+k}$)) containing the sign information of signal E54. Where E54="1"($-y_{i+k}$), then gates $50_1$–$50_6$ invert the logical level of signal D36 and provide signal D50 (=D36($-y_{i+k}$)). Similarly, the 6-bit signal D46 of second wave memory 46 is applied to each input of EX OR gates $52_1$ to $52_6$ of circuit 52. The other input of each of gates $52_1$–$52_6$ receives the second signal E56($\mp y_{i+k}$). Gates $52_1$–$52_6$ directly transfer signal D46 when E56="0"($+y_{i+k}$), and they invert signal D46 when E56="1"($-y_{i+k}$). Gates $52_1$–$52_6$ supplies a 6-bit full adder 58 with a gated signal D52 which corresponds to +D46 or −D46 and contains the sign information ($y_{i+k}$) of signal E56. Thus, D52=D46($\mp y_{i+k}$).

Adder 58 receives the gated signals D50 and D52 and adds D52 to D50 with an additional data "+1" which changes the complement of "one" to the complement of "two". Where E54="0" and E56="1", then D50=D36($y_{i+k}$) and D52=−D46($y_{i-k}$). Thus, adder 58 adds "−D46($y_{i+k}$)" to "D36($y_{i+k}$)" and outputs an added result D58=(D36−D46)($y_{i+k}$). Where E54="1" and E56="0", then D50=−D36($y_{i+k}$) and D52=D46($y_{i+k}$). Thus, adder 58 adds "D46($y_{i+k}$)" to "−D36($y_{i+k}$)" and outputs an added result D58=(D46−D36)($y_{i+k}$)=(D36−D46)($-y_{i+k}$).

These results represented by (D36−D46)($y_{i+k}$) and (D36−D46)($-y_{i+k}$) are identical with equation (1) mentioned earlier.

Figure 6:
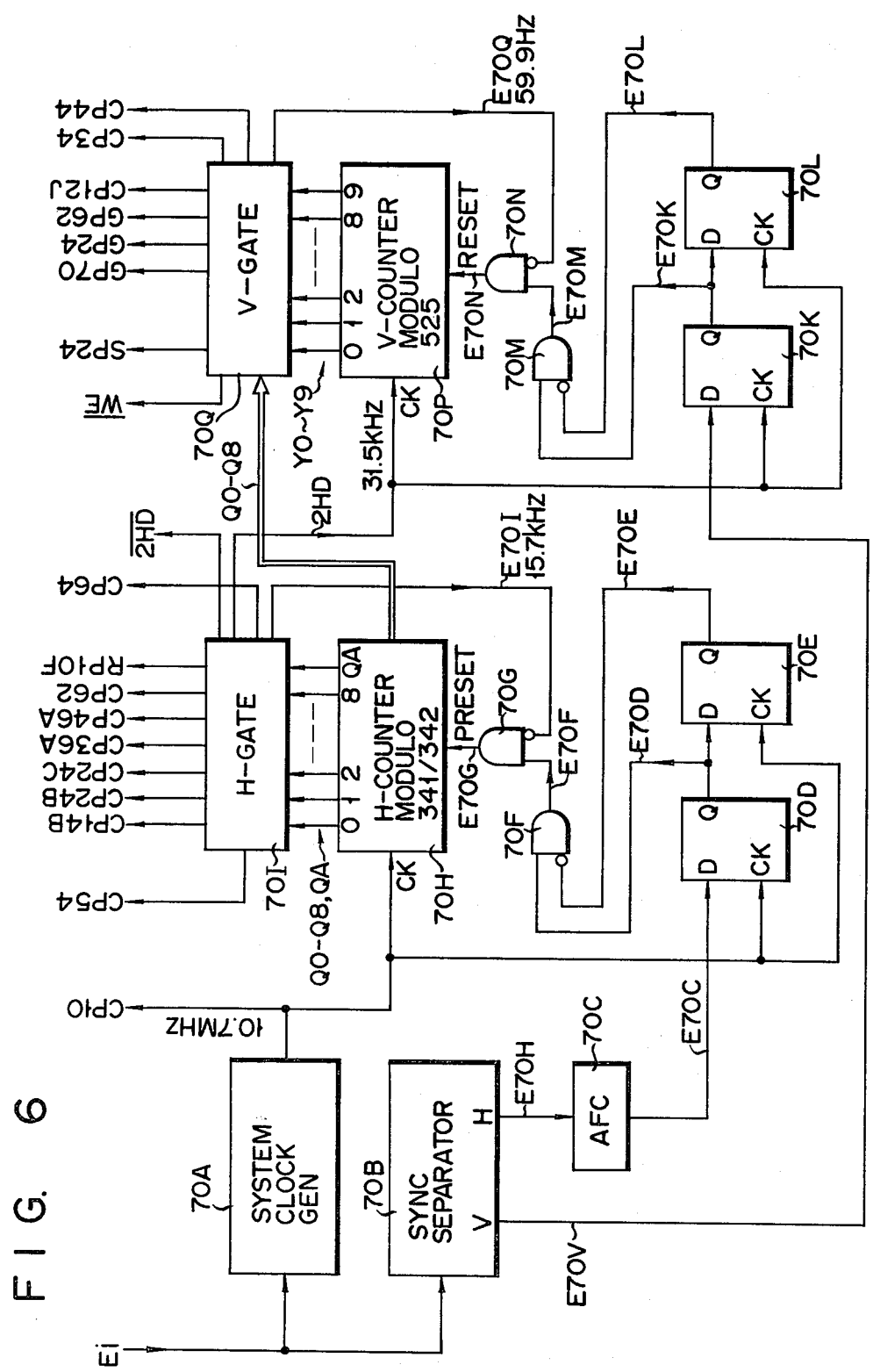
FIG. 6 is one embodiment of a timing pulse generator 70 shown in FIG. 1.
Figure 7:
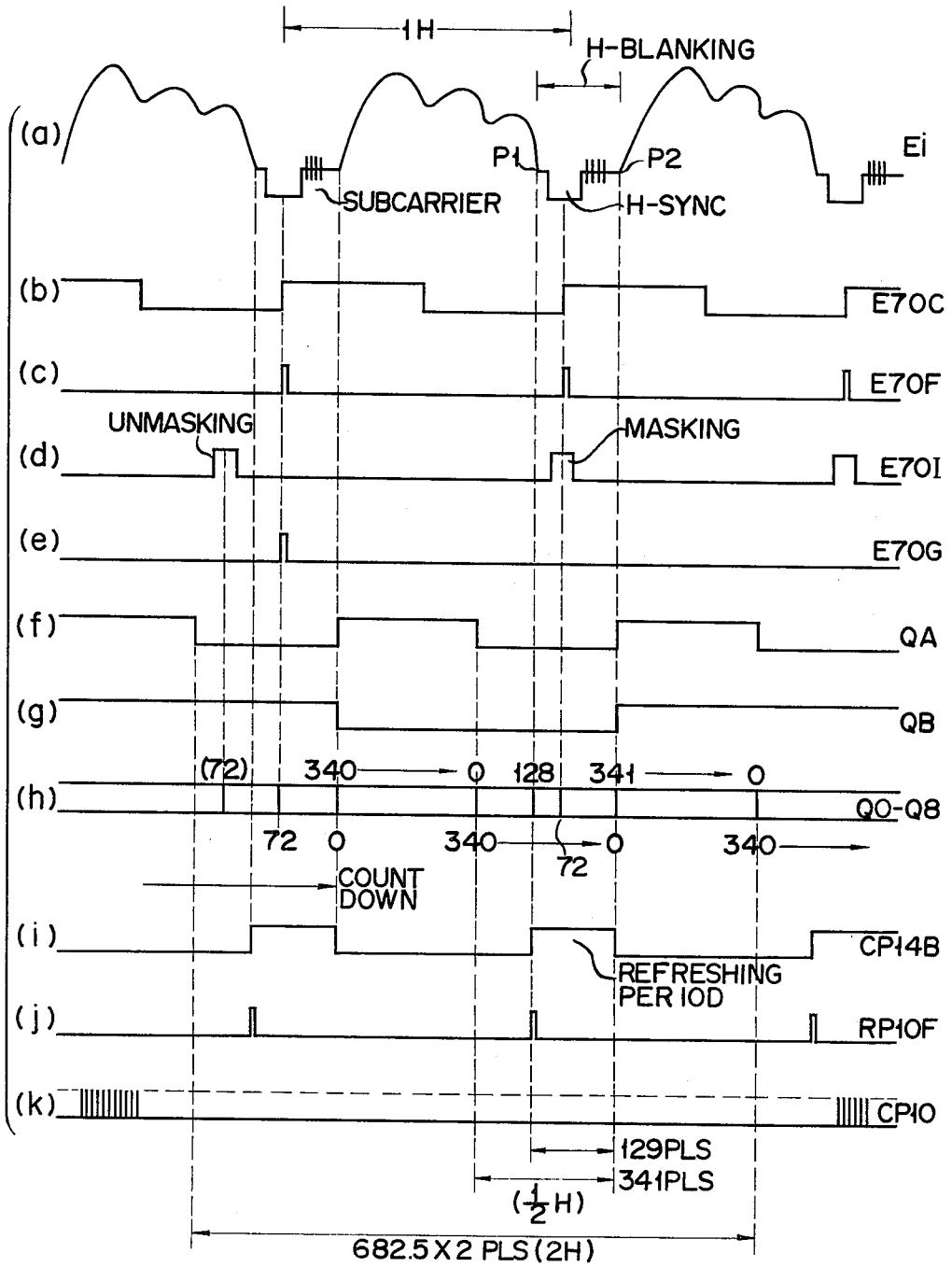

FIG. 6 is an embodiment of a timing pulse generator 70 shown in FIG. 1. FIG. 7 is a timing chart illustrating the operation of a H-counter 70H shown in FIG. 6.

The video input Ei is applied to a system clock generator 70A and a sync signal separator 70B. Generator 70A includes a voltage controlled oscillator (VCO) having a 10.7 MHz crystal. The VCO of generator 70A generates the system clock pulse CP10 of 10.7 MHz which is exactly identical with the three times of 3.58 MHz color subcarrier contained in video input Ei (FIG. 7a). Separator 70B separates from input Ei a horizontal synchronization (H-sync) signal E70H and a vertical synchronization (V-sync) signal E70V. Signal E70H is applied to an AFC circuit 70C. Circuit 70C outputs a controlled H-sync signal E70C (FIG. 7b) whose phase and frequency are automatically identified with the center position of H-sync signal E70H. AFC circuit 70C is effective for avoiding influence of noises or ghost components involved in video input Ei. Signal E70C is applied to a D-input of a D type flip-flop (FF) 70D. An output E70D of FF 70D is applied to a D-input of a D-FF 70E. FF's 70D and 70E are clocked by pulse CP10 obtained from generator 70A. An output E70E of FF 70E is applied to an inverted input of an AND gate 70F. Gate 70F receives at its other input the output E70D. An output E70F (FIG. 7c) of gate 70F is applied to an input of an AND gate 70G. Gate 70G outputs a preset signal E70G (FIG. 7e).

The signal E70G is applied to a preset input of a H-counter 70H. Counter 70H may be formed of a 9-stage binary counter (modulo 341/342) having 9 bits outputs Q0–Q8 and a 2-stage binary counter (modulo 4) having 2 bits outputs QA and QB. The 9-stage counter counts the pulse CP10, and the 2-stage counter counts a carry out of the 9-stage counter. Count outputs Q0–Q8 and QA of H-counter 70H are applied to a H-gate 70I. Gate 70I provides a H masking pulse E70I (15.7 kHz) (FIG. 7d) and a signal 2HD (31.5 kHz). Masking pulse E70I is fed back to an inverted input of gate 70G. Where output E70F appears at the time when pulse E70I disappears (FIGS. 7c and 7d; left side), then H-counter 70H is preset by signal E70G corresponding to output E70F (FIGS. 7c and 7e). In other words, H-counter 70H is locked by output E70F. Signal E70G presets the 9-stage and 2-stage counters to, e.g. "72" and QA="0" (FIGS. 7f and 7h), and the 9-stage counter whose modulo is "341" counts the preset data "72"

down to "0" by pulse CP10 (FIG. 7k). The modulo "341" counter is obtained when data "340" is preset, since the counter counts "340" down to "0" by 341 pulses of CP10. The 9-stage counter is changed from modulo "341" to modulo "342" when the 2-stage counter counts "4" which corresponds to QA=QB=-logical "1" (FIGS. 7f and 7g). That is, the 9-stage counter is generally modulo "341" counter and is once changed to modulo "342" counter after three times count-downs of modulo "341" (FIG. 7h). Thus, the 9-stage counter counts 1,365 (=341×3+342) pulses during a double horizontal scanning period 2H. Accordingly, H-counter 70H functions as a modulo "682.5 (=1,365/2)" counter for one horizontal scanning period 1H. When outputs E70F and E70I appear simultaneously (FIGS. 7c and 7d; right side), gate 70G stops output E70F, i.e. the logical "1" of pulse E70I masks the output E70F. In this case, H-counter 70H continues the count down of modulo "682.5" independent of the output E70F. Practically, 2 μs is sufficient for the pulse width of pulse E70I for assuring said masking.

Charges stored in capacitors C1+− to C128+− (FIG. 2) are refreshed every horizontal scanning. To avoid picture noises due to such refreshment, the refreshing operation is carried out during the horizontal blanking period (FIGS. 7a and 7i). For this purpose, the present data of H-counter 70H preset by signal E70G is selected to, e.g. "72" so that the count end (count zero point) of H-counter 70H is substantially identical with the trailing edge (P2) of the back porch of video input Ei (FIGS. 7a, 7e and 7h). The refresh start pulse RP10F applied to SR 10F of FIG. 2 is generated at the leading edge (P1) of the horizontal blanking period (FIGS. 7a, 7i and 7j). More specifically, pulse RP10F is generated at which the contents of H-counter 70H is "128" (FIGS. 7h, 7i and 7j).

The V sync signal E70V is applied to a D-input of a D-FF 70K. An output E70K of FF 70K is applied to a D-input of a D-FF 70L. FF's 70K and 70L are clocked by the signal 2HD obtained from H-gate 70I. An output E70L of FF 70L is applied to an inverted input of an AND gate 70M. Gate 70M receives at its other input the output E70K. An output E70M of gate 70M is applied to an input of an AND gate 70N. Gate 70N outputs a reset signal E70N. Signal E70N is applied to a reset input of a V-counter 70P. Counter 70P may be formed of a 10-stage binary counter (modulo 525) having a conventional configuration. Signal E70N resets counter 70P to "0". Counter 70P counts signal 2HD (31.5 kHz). Count outputs Y0–Y9 of V-counter 70P and count outputs Q0–Q8 of H-counter 70H are applied to a V-gate 70Q. Gate 70Q supplies an inverted input of the gate 70N with a V masking pulse E70Q (59.9 Hz=31.5 kHz/525). Where output E70M appears at the time when pulse E70Q is logical "0", then counter 70P is reset to "0" by output E70M. The V masking pulse E70Q has the same function as said H masking pulse E70I, i.e. the logical "1" of pulse E70Q masks output E70M.

Details as to said masking are discussed in Japanese Patent Application No. 55-58394 titled "SYNCHRONIZING CIRCUIT" filed by the same assignee (TOSHIBA CO.) as the present application. This Japanese application corresponds to the Public Patent Disclosure No. 56-154879 of Nov. 30, 1981. The disclosure of this Japanese Patent Application is combined herewith. When outputs E70M and E70Q appear simultaneously, V-counter 70P of modulo "525" free runs independent of output E70M.

The H-gate 70I generates pulses CP54, CP14B, CP24B, CP24C, CP36A, CP46A, CP62, RP10F, $\overline{2HD}$, 2HD, CP64 and E70I. The V-gate 70Q generates pulses $\overline{WE}$, SP24, GP70, GP24, GP62, CP12J, CP34, CP44 and E70Q.

Figure 6A:
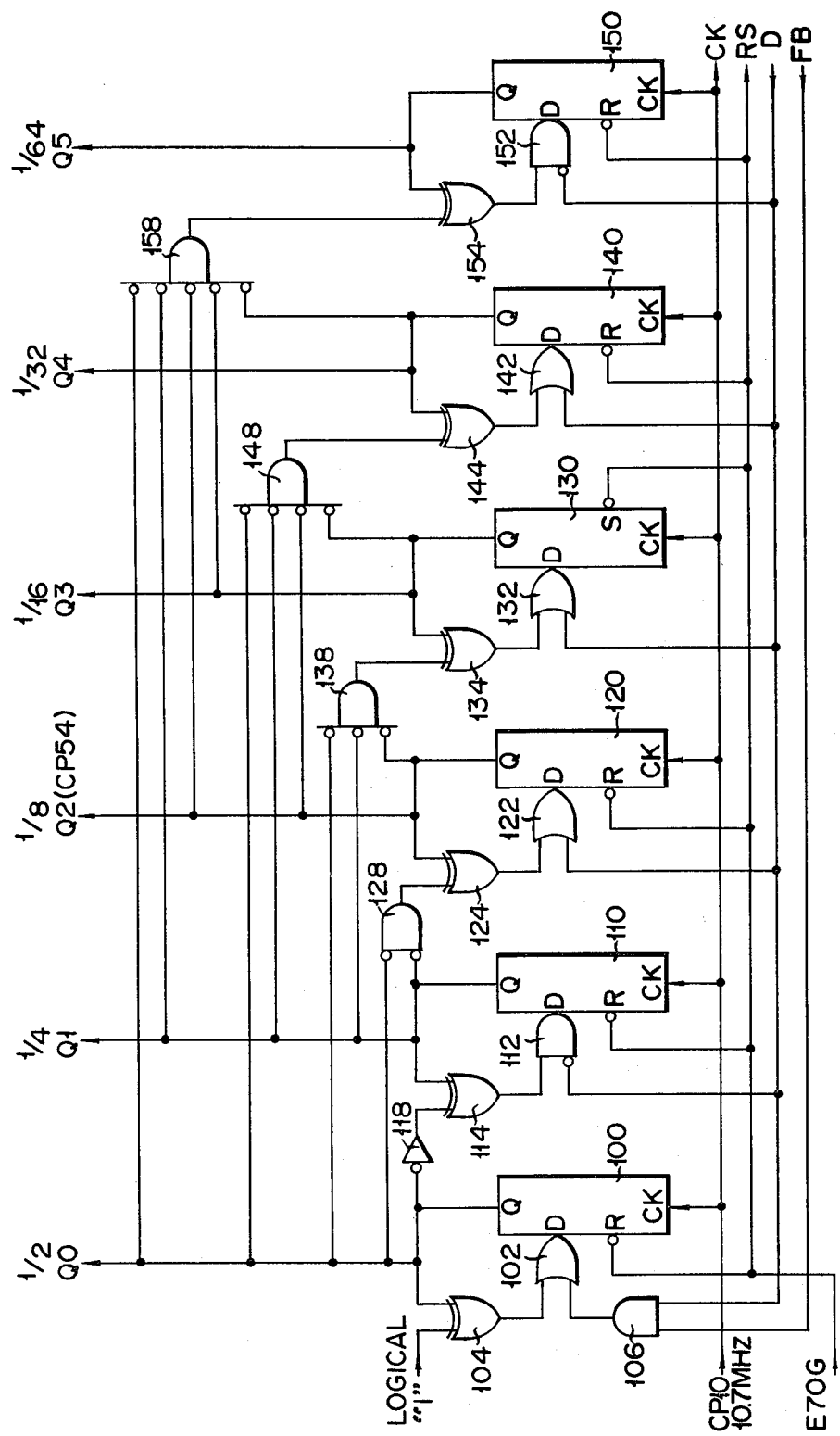
FIGS. 6A and 6B jointly show one embodiment of an H-counter 70H shown in FIG. 6.
Figure 6B:
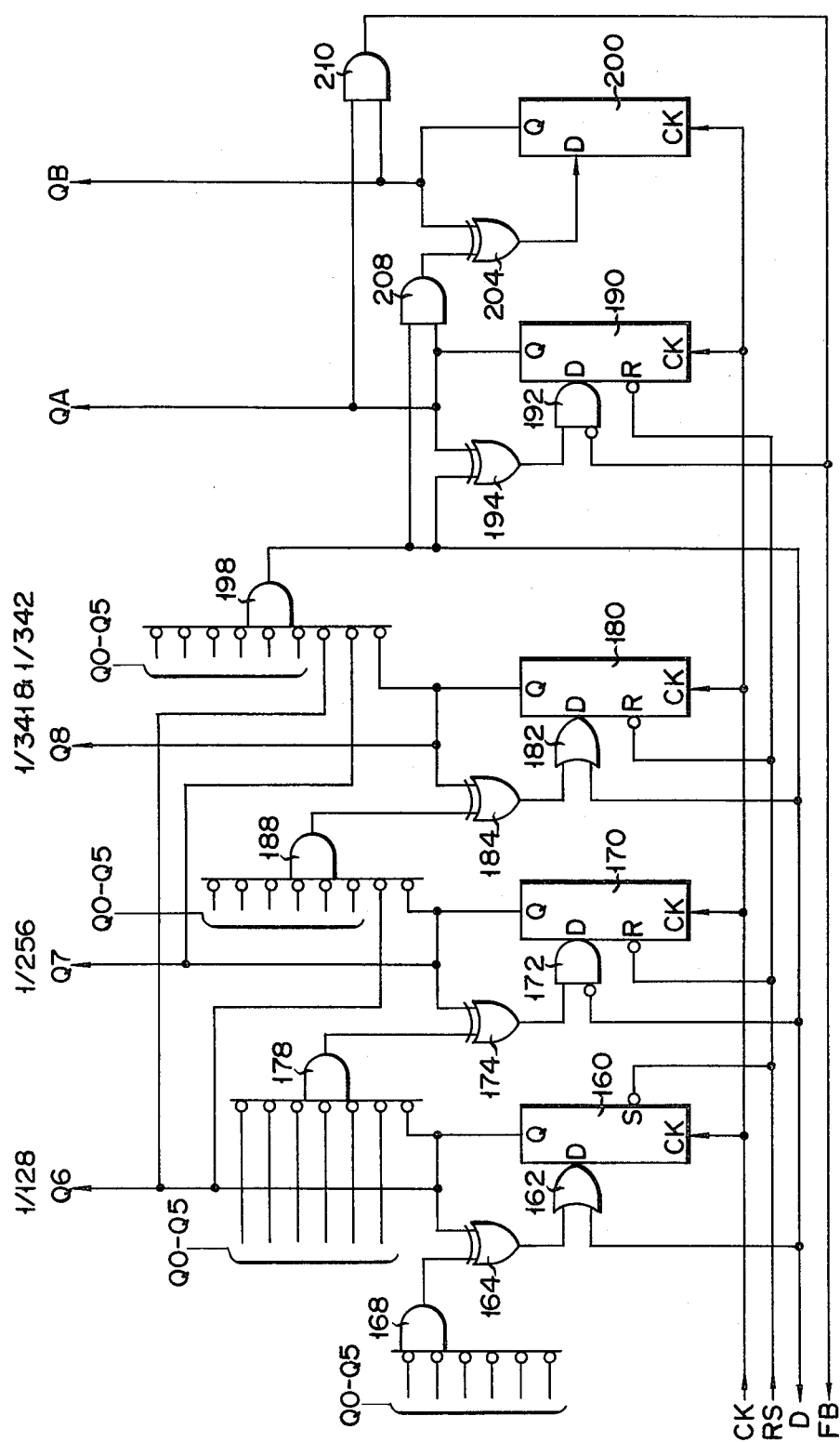

FIGS. 6A and 6B show one embodiment of H-counter 70H shown in FIG. 6. FIG. 8 shows the output waveforms of H-counter 70H.

In FIG. 6A the system clock pulse CP10 (10.7 MHz) (FIG. 8a) is applied to each clock input CK of D type FF's 100–200. The preset signal E70G is applied to each reset input R of FF's 100, 110, 120, 140, 150, 170, 180 and 190. Signal E70G is also applied to each set input S of FF's 130 and 160. When E70G="1", FF's 100–180 are so preset that outputs Q0–Q8 of these FF's are (000100100) corresponding to decimal 72. A D-input of FF 100 is connected to an output of an OR gate 102. One input of gate 102 is connected to an output of an EX OR gate 104. One input of gate 104 receives a logical "1" signal, and the other input thereof receives an output Q0 (5.35 MHz) of FF 100 (FIG. 8b). The other input of gate 102 is connected to an output of an AND gate 106. Respective two inputs of gate 106 receive a feed back signal FB and a data signal D (FIG. 8m).

The output Q0 is applied via an inverter 118 to one input of an EX OR gate 114. The other input of gate 114 receives an output Q1 (2.68 MHz) (FIG. 8c) of FF 110. An output of gate 114 is connected to an input of an AND gate 112. An inverted input of gate 112 receives the signal D. An output of gate 112 is connected to a D-input of FF 110.

The outputs Q0 and Q1 are respectively applied to two inverted inputs of an AND gate 128. An output of gate 128 is connected to one input of an EX OR gate 124. The other input of gate 124 receives an output Q2 (1.34 MHz) (FIG. 8d) of FF 120. Output Q2 may be used as the inverting clock pulse CP54 (FIG. 8v). An output of gate 124 is connected to one input of an OR gate 122. The other input of gate 122 receives the signal D. An output of gate 122 is connected to a D-input of FF 120.

The outputs Q0–Q2 are respectively applied to three inverted inputs of an AND gate 138. An output of gate 138 is connected to one input of an EX OR gate 134. The other input of gate 134 receives an output Q3 of FF 130 (FIG. 8e). An output of gate 134 as well as the signal D are coupled via an OR gate 132 to a D-input of FF 130.

The outputs Q0–Q3 are applied to one input of an EX OR gate 144 via four inverted inputs of an AND gate 148. The other input of gate 144 receives an output Q4 of FF 140 (FIG. 8f). An output of gate 144 and the signal D are coupled via an OR gate 142 to a D-input of FF 140.

The outputs Q0–Q4 are applied via five inverted inputs of an AND gate 158 to one input of an EX OR gate 154. The other input of gate 154 receives an output Q5 of FF 150 (FIG. 8g), and an output of gate 154 is connected to an input of an AND gate 152. An inverted input of gate 152 receives the signal D, and an output of gate 152 is connected to a D-input of FF 150.

In FIG. 6B, the outputs Q0–Q5 are applied via six inverted inputs of an AND gate 168 to one input of an EX OR gate 164. The other input of gate 164 receives an output Q6 of FF 160 (FIG. 8h) whose D-input receives via an OR gate 162 an output of gate 164 as well as the signal D.

The outputs Q0–Q6 are applied via seven inverted inputs of an AND gate 178 to one input of an EX OR gate 174. Gate 174 receives at the other input an output Q7 of FF 170 (FIG. 8i). An output of gate 174 is coupled via an AND gate 172 to a D-input of FF 170. An inverted input of gate 172 receives the signal D.

The outputs Q0–Q7 are applied to eight inverted inputs of an AND gate 188 whose output is coupled to a D-input of FF 180 via an EX OR gate 184 and an OR gate 182. Gate 184 receives an output Q8 (31.5 kHz) of FF 180 (FIG. 8j), and gate 182 receives the signal D. The output Q8 may be used as said signal 2HD.

FF's 100–180 jointly constitute a 9-stage binary counter of modulo "341" or "342".

The outputs Q0–Q8 of the 9-stage counter are respectively applied to nine inverted inputs of an AND gate 198. Gate 198 outputs the data signal D. Signal D presets FF's 100–180 so that Q0–Q8 are (001010101) corresponding to decimal 340. Signal D is applied to one input of an EX OR gate 194. The other input of gate 194 receives an output QA of FF 190 (FIG. 8k). An output of gate 194 is coupled to an input of an AND gate 192. An inverted input of gate 192 receives the feed back signal FB. An output of gate 192 is connected to a D-input of FF 190.

The data signal D and the output QA are respectively applied to two inputs of an AND gate 208. An output of gate 208 is connected to one input of an EX OR gate 204. The other input of gate 204 receives an output QB of FF 200, and an output of gate 204 is connected to a D-input of FF 200. The outputs QA and QB are respectively applied to two inputs of an AND gate 210. Gate 210 provides the feed back signal FB. Where the signal D is "1" and the outputs QA and QB are not all "1", then the preset data (Q0, Q1, Q2, ..., Q8) for H-counter 70H become (001010101) or modulo "341". When the signal D as well as the outputs QA and QB are all "1", i.e. the 2-stage counter counts four, the preset data are changed from (001010101) to (101010101) or to modulo "342" by the logical "1" of feed back signal FB and data signal D.

FF's 190 and 200 form a 2-stage binary counter of modulo "4". The feed back signal FB derived from the 2-stage counter changes the modulo "341" of the 9-stage counter to modulo "342". Such modulo change is necessary for identifying the counting period of H-counter 70H with the H-sync signal period of video input Ei.

FIG. 6C is an embodiment of a gate circuit for generating the pulses CP24A, CP32, CP36, CP42 and CP46.

The sign signal E24 derived from the third shift register (SR) 24J shown in FIG. 3 is applied to an N bits SR 70S which is clocked by the system clock pulse CP10. N are generally 3 to 4. SR 70S delays signal E24 and outputs a delayed sign signal E70S. The delay time of SR 70S corresponds to a signal delay at the LPF 20A (FIG. 3) so that the signal delay of LPF 20A is compensated by the delay at SR 70S. Signal E70S is applied to a reset input R of FF 70T. FF 70T receives at its set input S the start pulse SP24. An output E70T of FF 70T is applied to one input of an AND gate 70V. The other input of gate 70V receives the pulse CP10. Gate 70V outputs the loading pulse CP24A only when FF 70T is set.

The shift pulse E24C derived from the first SR 24C (FIG. 3) is applied to a reset input R of an FF 70U. A set input S of FF 70U receives the start pulse SP24. An output E70U of FF 70U is applied to each first input of AND gates 70W and 70X. Each second input of gates 70W and 70X receives pulse CP10. A third input of gate 70W is connected to an output Q of a T type FF 70Y. An output $\overline{Q}$ of FF 70Y is coupled to a third input of gate 70X. FF 70Y receives at its T input the pulse CP10 (10.7 MHz). Thus, the frequency of each of outputs Q and $\overline{Q}$ is 5.35 MHz. An output E70W of gate 70W is applied to one input of an AND gate 70WA. An output E70X of gate 70X is applied to one input of an AND gate 70XA. The other input of each of gates 70WA and 70XA receive a gate pulse GP70 which is logical "1" only when the count of V-counter 70P is, e.g., "518". An output CP36A of gate 70WA is applied to one input of an OR gate 70WB. An output CP46A of gate 70XA is applied to one input of an OR gate 70XB. Gate 70WB receives at its other input a pulse CP36B and outputs the pulse CP36. Gate 70XB receives at its other input a pulse CP46B and outputs the pulse CP46. Pulses CP36A and CP46A are used as the loading pulses CP32 and CP42, respectively.

Figure 6D:
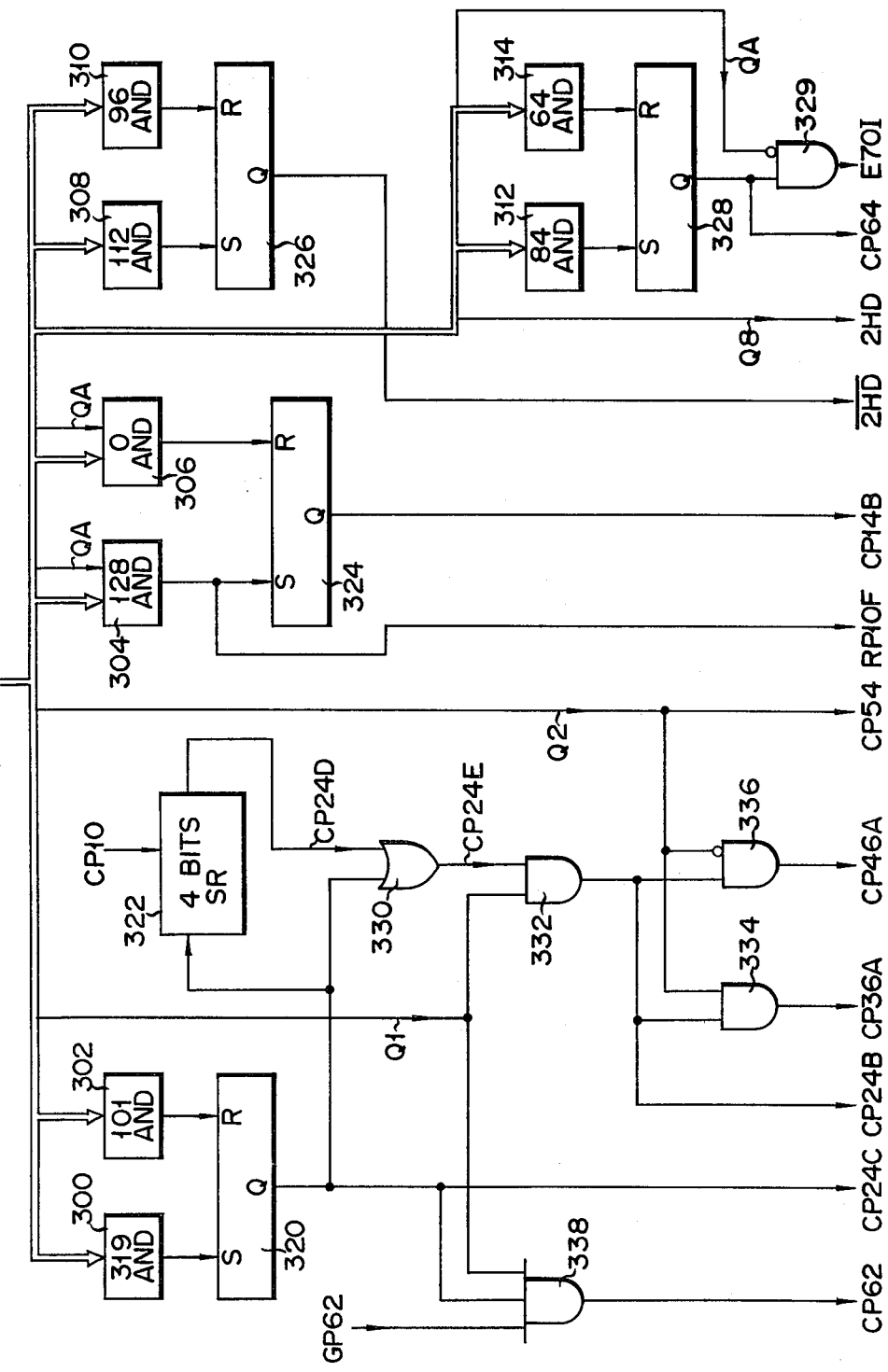
FIG. 6D is one embodiment of an H-gate 70I shown in FIG. 6.

FIG. 6D is one embodiment of the H-gate 70I shown in FIG. 6. FIG. 8 is a timing chart illustrating the operation of H-gate 70I.

The count outputs Q0–Q8 and QA of the H-counter 70H (FIG. 6) are applied to AND gates 300 to 314. Each of these gates has 10 inputs. Gate 300 detects the binary (111 111 001) or decimal "319" of outputs Q0–Q8. That is, gate 300 provides an ANDed output having logical "1" only when the outputs Q0–Q8 correspond to decimal "319". Similarly, gates 302-314 detect decimal "101", "128" (QA="0"), "0" (QA="0"), "112", "96", "84" and "64". When outputs Q0–Q8 correspond to "319", gate 300 sets a flip-flop (FF) 320. During the set mode, FF 320 outputs the pulse CP24C (FIG. 8q) which is applied to the buffer 24 (FIG. 1). When outputs Q0–Q8 correspond to "101", gate 302 resets FF 320 so that pulse CP24C disappears. Pulse CP24C is inputted to a 4-bit shift register (SR) 322. SR 322 is clocked by the pulse CP10 and delays the inputted pulse by 4 pulses of CP10. Then, SR 322 outputs a pulse CP24D (FIG. 8s).

The pulses CP24C and CP24D are applied to an OR gate 330. Gate 330 outputs a pulse CP24E (FIG. 8t). Pulse CP24E is applied to one input of an AND gate 332. Gate 332 receives at the other input the output Q1 of H-counter 70H (FIG. 8c). Gate 332 outputs the pulse CP24B during which pulse CP24E is logical "1" (FIGS. 8t and 8u). Pulse CP24B is applied to one input of each of AND gates 334 and 336. The other input of gate 334 and the inverted input of gate 336 receive the output Q2 of H-counter 70H (FIG. 8d). The output Q2 is used as the inverting clock pulse CP54 (FIG. 8v). Gate 334 supplies the gate 70WB (FIG. 6C) with the pulse CP36A (FIG. 8w), and gate 336 supplies the gate 70XB (FIG. 6C) with the pulse CP46A (FIG. 8x). The output Q1 and pulse CP24C are applied to an AND gate 338. Gate 338 receives the pulse GP62 obtained from V-gate 70Q (FIG. 6). Gate 338 outputs the correlation control signal CP62 (FIG. 8r).

When the outputs Q0–Q8 correspond to "128" and QA="0", the gate 304 provides the refresh start pulse RP10F (FIG. 8o). Pulse RP10F sets an FF 324. FF 324 is reset by the output of gate 306 at the time when outputs Q0–Q8 correspond to "0" and QA="0". During the set mode, FF 324 outputs the address change gate pulse CP14B (FIG. 8n). Pulse CP14B is logical "1" only when QA="0" and the outputs Q0-Q8 fall within "127" to "0" during which the refreshment for the capacitors C1+− to C128+− (FIG. 2) is carried out. When outputs Q0-Q8 correspond to "112", an FF 326 is set by gate 308. When outputs Q0-Q8 correspond to "96", FF 326 is reset by gate 310. Where outputs Q0-Q8 fall within "112" to "96", then FF 326 outputs the signal $\overline{2HD}$ (FIG. 8p). The output Q8 of H-counter 70H may be used as the signal 2HD (FIG. 8j). When outputs Q0-Q8 correspond to "84", an FF 328 is set by gate 312. When outputs Q0-Q8 correspond to "64", FF 328 is reset by gate 314. Where outputs Q0-Q8 fall within "84" to "64", then FF 328 outputs the latch pulse CP64 (FIG. 8y). Latch pulse CP64 is applied to an AND gate 329. An inverted input of gate 329 receives output QA, and gate 329 provides the masking pulse E70I (FIG. 8l).

Figure 6E:
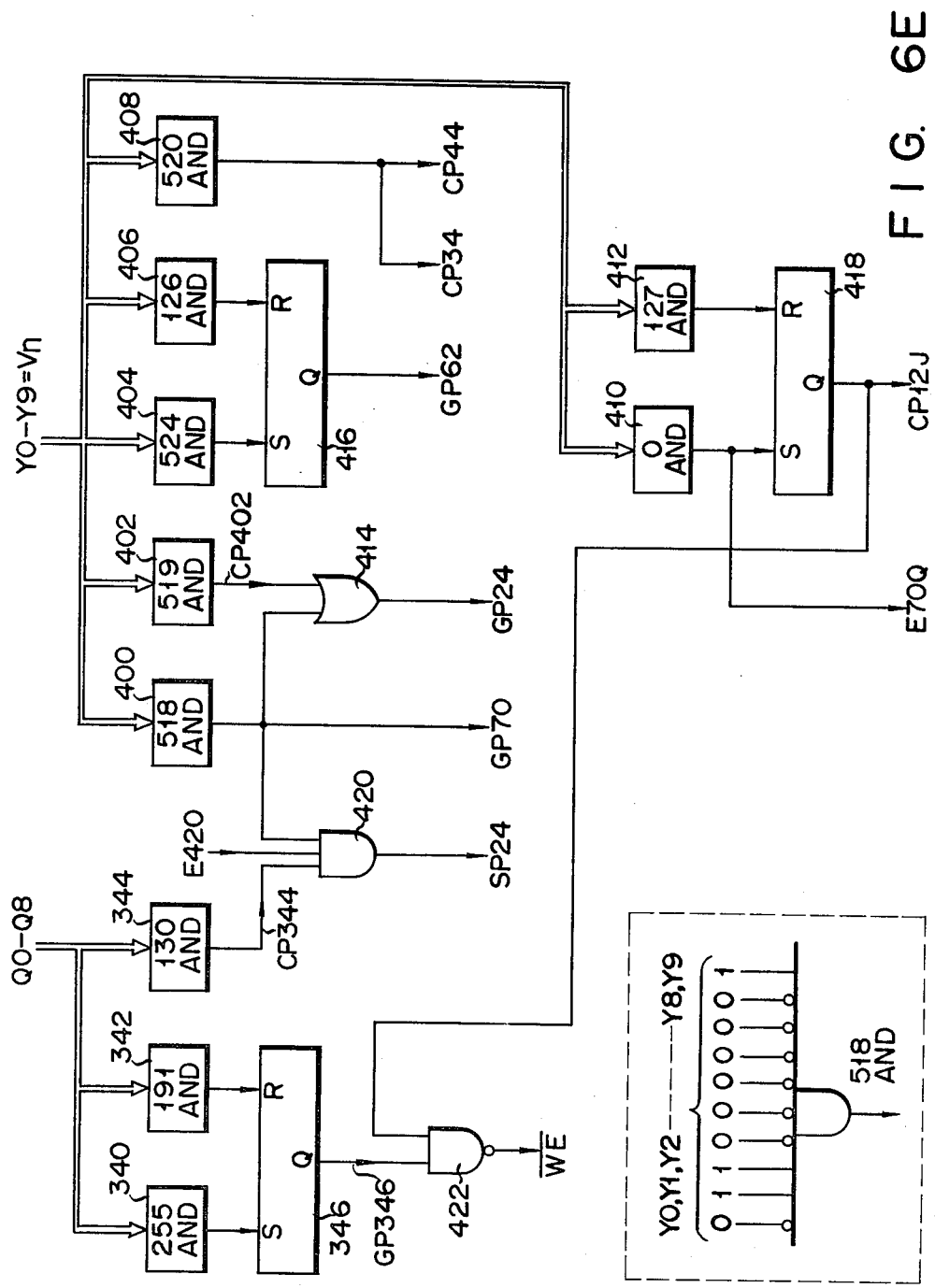
FIG. 6E is one embodiment of a V-gate 70Q shown in FIG. 6.
Figure 9:
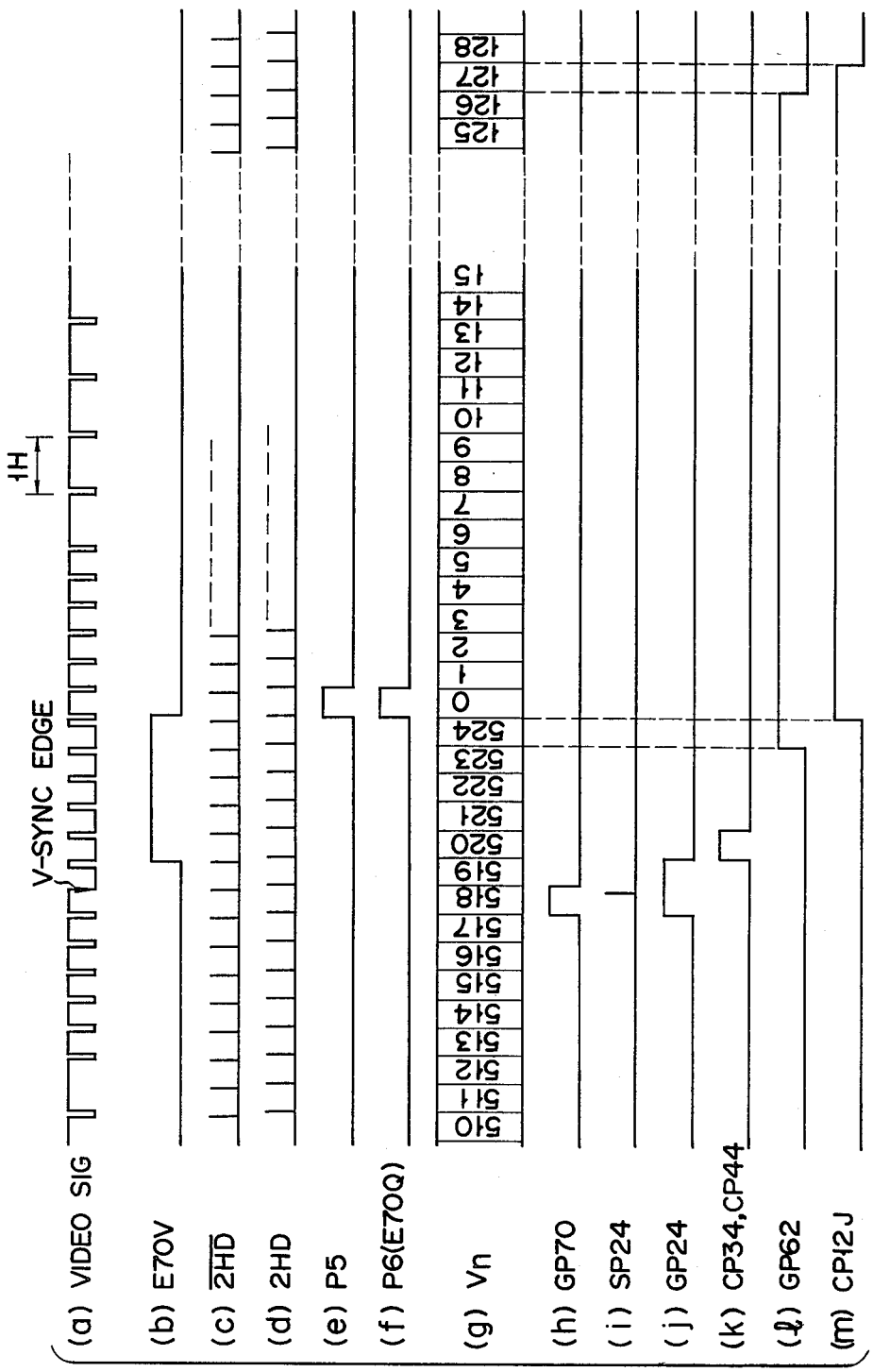
FIGS. 9 and 10 are timing charts illustrating the operation of the V-counter 70P and V-gate 70Q.
Figure 10:
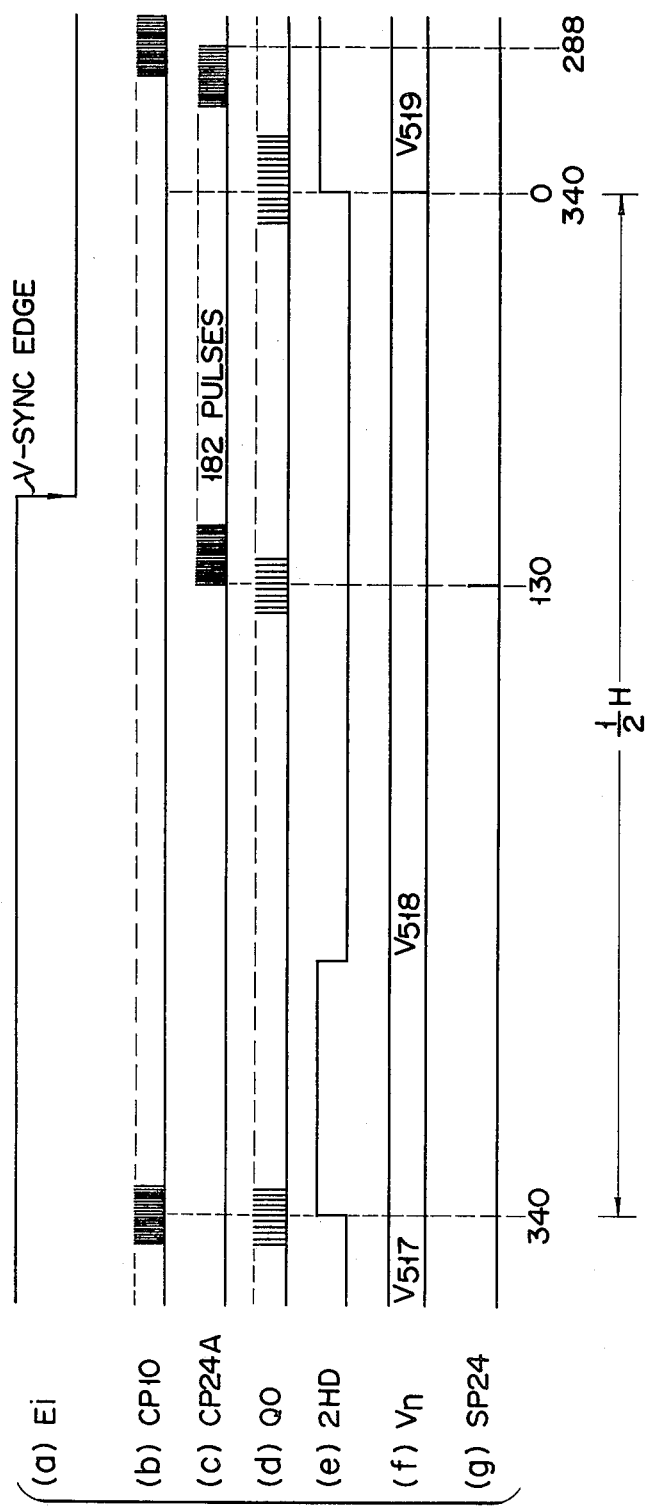

FIG. 6E is one embodiment of the V-gate 70Q shown in FIG. 6. FIGS. 9 and 10 are timing charts illustrating the operation of V-gate 70Q and V-counter 70P.

The count outputs Q0-Q8 of H-counter 70H are applied to 9-input AND gates 340-344. Gate 340 sets a flip-flop (FF) 346 when outputs Q0-Q8 correspond to decimal "255". When outputs Q0-Q8 correspond to "191", gate 342 resets FF 346. FF 346 outputs a gate pulse GP346 during which outputs Q0-Q8 fall within "255" to "191". Gate 344 outputs a pulse CP344 when outputs Q0-Q8 correspond to "130".

The count outputs Y0-Y9 of V-counter 70P or a 10-bit V count data $V_n$ is applied to 10-input AND gates 400-412. When data $V_n$ is "518", gate 400 outputs the gate pulse GP70 (FIGS. 9g and 9h). Pulse GP70 is applied to gates 70WA and 70XA of FIG. 6C. The pulses GP70 and CP344 are applied to an AND gate 420. Gate 420 receives a signal E420 which is temporarily logical "1" at the time when the channel of TV set is changed or when the power thereof is ON. Gate 420 outputs the start pulse SP24 when E420="1", Q0-Q8="130" (FIG. 10g) and $V_n$="518" (FIG. 9i). When $V_n$="519", gate 402 outputs a pulse CP402. Pulses GP70 and CP402 are applied to an OR gate 414. Gate 414 outputs the gate pulse GP24 (FIG. 9j). When $V_n$="524", gate 404 sets an FF 416. When $V_n$="126", gate 406 resets FF 416. During the set mode, FF 416 outputs the gate pulse GP62 (FIG. 9l) which is applied to the gate 338 (FIG. 6D). When $V_n$="520", gate 408 outputs the enabling pulses CP34 and CP44 (FIG. 9k). At this time, the adders 34 and 44 of FIG. 1 carry out the addition of +1 or −1. Except $V_n$="520", no addition is made in adders 34 and 44. When $V_n$="0", gate 410 outputs the masking pulse E70Q. An FF 418 is set by pulse E70Q. FF 418 is reset by gate 412 when $V_n$="127". During the set mode, FF 418 outputs the loading pulse CP12J (FIG. 9m) which is used as a gate signal for the pulse $\overline{WE}$ and is applied to the latch 12J (FIG. 2B).

The pulses CP12J is applied to one input of a NAND gate 422. The other input of gate 422 receives the gate pulse GP346. Gate 422 outputs the write enable pulse $\overline{WE}$ only when outputs Q0-Q8 fall within "255" to "191" (FIG. 8z) and $V_n$ falls within "0" to "127" (FIGS. 9g and 9m).

The summarized operational sequence of FIG. 1 apparatus according to the count of V-counter 70P will be as follows.

The data loading or storing for the buffers 24, 32 and 42 are completed when $V_n=V_{518}$ and $V_{519}$ (FIG. 9j).

The addition of +1 or −1 is carried out in each of adders 34 and 44 only when $V_n=V_{520}$ (FIG. 9k).

The correlation operation for obtaining the data $d_1$ to $d_{128}$ is carried out when $V_n=V_{524}$ to $V_{126}$ (FIG. 9l). In the present embodiment, $d_1$ is obtained when $V_n=V_{524}$, and $d_{128}$ is obtained when $V_n=V_{126}$.

The correction of each tap coefficient is carried out during $V_n=V_0$ to $V_{127}$ (FIG. 9m). Thus, where $V_n=V_0$, then the first tap coefficient data stored in 0th address of TCM 14A (FIG. 2B) is renewed by the data $d_1$ which has been obtained at $V_{524}$. Similarly, where $V_n=V_{127}$, then the 128th tap coefficient data in 127th address of TCM 14A is renewed by the data $d_{128}$ obtained at $V_{126}$. The write enabling signal $\overline{WE}$ is generated only during $V_n=V_0$ to $V_{127}$.

FIG. 6F is an improved modification of the peripheral circuitry of V-counter 70P shown in FIG. 6.

The signal 2HD derived from the H-gate 70I is applied to a clock input of 3-bit binary counter 500. counter 500 is reset by the V-sync signal E70V. Count outputs QA and QB of counter 500 are applied to an AND gate 502. An ANDed output of gate 502 is applied to a set input of an FF 504. FF 504 receives at its reset input the signal E70V. An output pulse P1 of FF 504 is applied to a D-input of an FF 506. FF 506 receives at its clock input the signal 2HD. An output pulse P2 of FF 506 is applied to a D-input of an FF 508. FF 508 receives at its clock input the signal 2HD. An output pulse P3 of FF 508 is applied to a D-input of an FF 510. FF 510 is clocked by the signal $\overline{2HD}$. An output pulse P4 of FF 510 is applied to one input of an AND gate 512. The other input of gate 512 receives the other output pulse $\overline{P2}$ of FF 506 whose phase is opposite to that of the output pulse P2.

An ANDed output pulse P5 of gate 512 is applied to a first input of an AND gate 514. Gate 514 receives at its second input the signal $\overline{2HD}$. An ANDed output E70N of gate 514 is applied to a V-counter 70P. Counter 70P counts the signal 2HD. Count outputs Y0-Y9 of counter 70P are applied to a V-gate 70Q. The configurations of counter 70P and gate 70Q may be the same as that shown in FIG. 6. Gate 70Q outputs a pulse P6 corresponding to the carry out of counter 70P or to the masking pulse E70Q. Pulse P6 is applied to each input of AND gates 516 and 518. The other input of gate 516 receives signal 2HD, and the other input of gate 518 receives the pulse P5. An ANDed output pulse P7 of gate 516 sets an FF 520. FF 520 is reset by an ANDed output pulse P8 of gate 518. An output pulse P9 of FF 520 is applied to a third input of gate 514. The ANDed output E70N resets the V-counter 70P.

The V-counter circuit of FIG. 6F is advantageous that the FIG. 6F counter is quite stably synchronized with the V-sync signal E70V even though the S/N of video input Ei is worse for noises or the input Ei involves substantive ghost components.

Details as to the operation of FIG. 6F circuitry are discussed in Japanese Patent Application No. 55-49353 titled "RESET CIRCUIT FOR V-COUNTER" filed by the same assignee (TOSHIBA CO.) as the present application. This Japanese application corresponds to the Public Patent Disclosure No. 56-146365 of Nov. 13, 1981. The disclosure of this Japanese Patent Application is combined herewith.

The whole circuit operation of the ghost canceller shown chiefly in FIG. 1 will be as follows.

The start timing of pulses CP24A, CP36A and CP46A (FIGS. 11b-11d) should exactly be fixed. This requirment is satistied by the start pulse SP24 with the circuit of FIG. 6C. The pulse SP24 is generated at the time when the count $V_n$ of V-counter 70P is "518" and the count Q0-Q8 of H-counter 70H is "130" (FIG. 10g). Pulse SP24 is inputted via OR gate 24B to 57 bits SR 24C (FIG. 3). SR's 24C, 24F and 24J form 182 bits shift register. Only when the pulses GP24 and SP24 appear (FIGS. 9i and 9j), SR's 24C, 24F and 24J store by 182 pulses of CP24A the V-sync edge portion contained in video output Eo (FIGS. 10a, 10c, 11a, 11b, 11e and 11f). SR's 24C and 24F store data corresponding to parameter "k" of sign signal $y_{i+k}$ while SR 24J stores and circulates the data corresponding to parameter "i+k" of signal $y_{i+k}$. Buffers 32 and 42 alternatively store the amplitude information of video input Ei by pulses CP32 and CP42 only when the FF 70U (FIG. 6C) is set and the gate pulse GP70 appears at $V_n=$"518" (FIGS. 9g and 9h). FF 70U is reset by pulse E24C derived from the first SR 24C (FIG. 3). Here, pulses CP32 and CP42 are used as pulse CP36A and CP46A, respectively. Thus, buffer 32 stores the amplitude information around said V-sync dege portion of input Ei by means of 28 pulses of CP36A corresponding to odd number pulses of CP24A, and buffer 42 stores said amplitude information by 28 pulses of CP46A corresponding to even number pulses of CP24A (FIGS. 11a-11f).

Once the SR's 24C, 24F and 24J complete their data storage, the gate pulse GP24 disappears, and the contents of SR's 24C, 24F and 24J are determined. Similarly, once the wave memories 36 and 46 complete their data storage, the gate pulse GP70 disappears and the contents of each of memories 36 and 46 are determined. After completion of data storage for SR's 24C, 24F, 24J and memories 36, 46, then the sign signal E24 is read out of SR 24J by means of pulse CP24B (FIG. 11b), the first wave signal D36 is read out of memory 36 by pulse CP36B (FIG. 11c), and the second wave signal D46 is read out of memory 46 by pulse CP46B (FIG. 11d).

Figure 11:
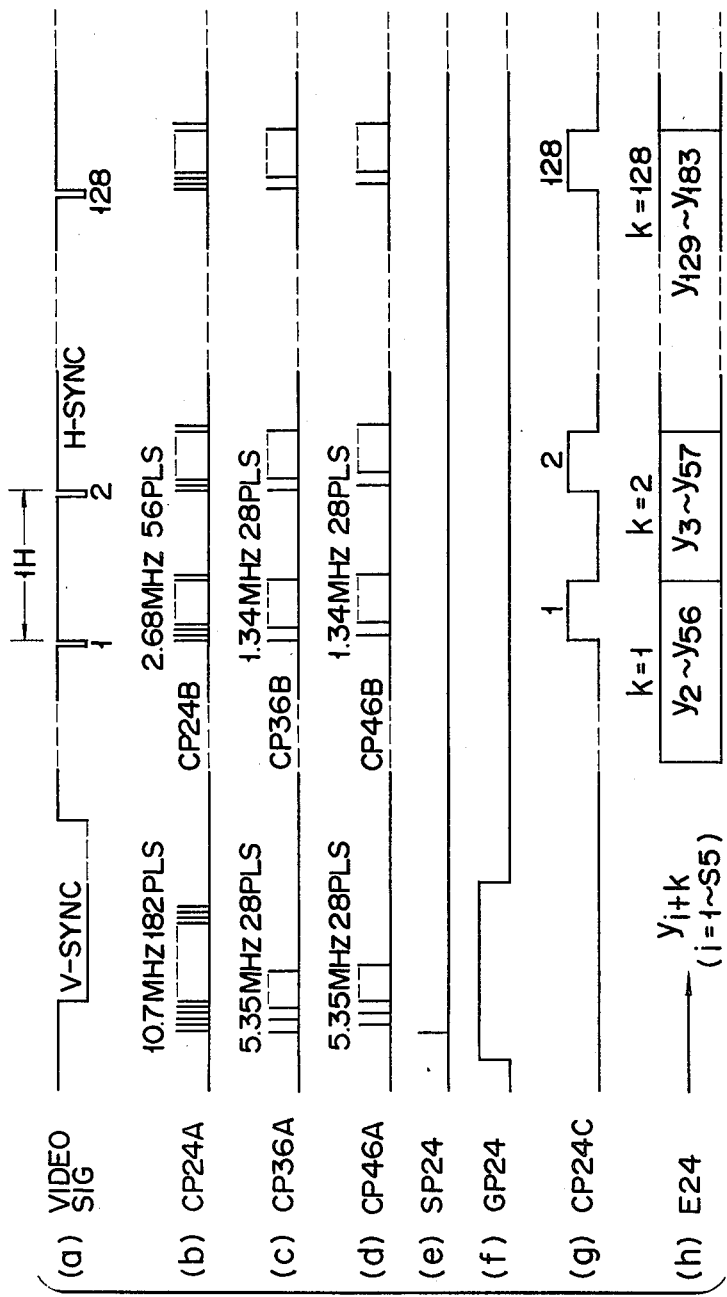
FIG. 11 is a timing chart illustrating the circuit operation of the automatic equalizer shown in FIG. 1.

The parameter "i" of sign signal $y_{i+k}$ (=E24) is changed by the pulse CP24B (FIG. 11b), and the parameter "k" of signal $y_{i+k}$ is changed by the pulse CP24C (FIG. 11g). Thus, the signal E24 is changed from $y_2$ to $y_{56}$ when k=1, from $y_3$ to $y_{57}$ when k=2, and from $y_{127}$ to $y_{183}$ when k=128 (FIG. 11h). Pulse CP24C as well as the pulse blocks of CP24B, CP36B and CP46B are synchronized with the H-sync or each count of H-counter 70H (FIGS. 11a-11g).

Figure 12:
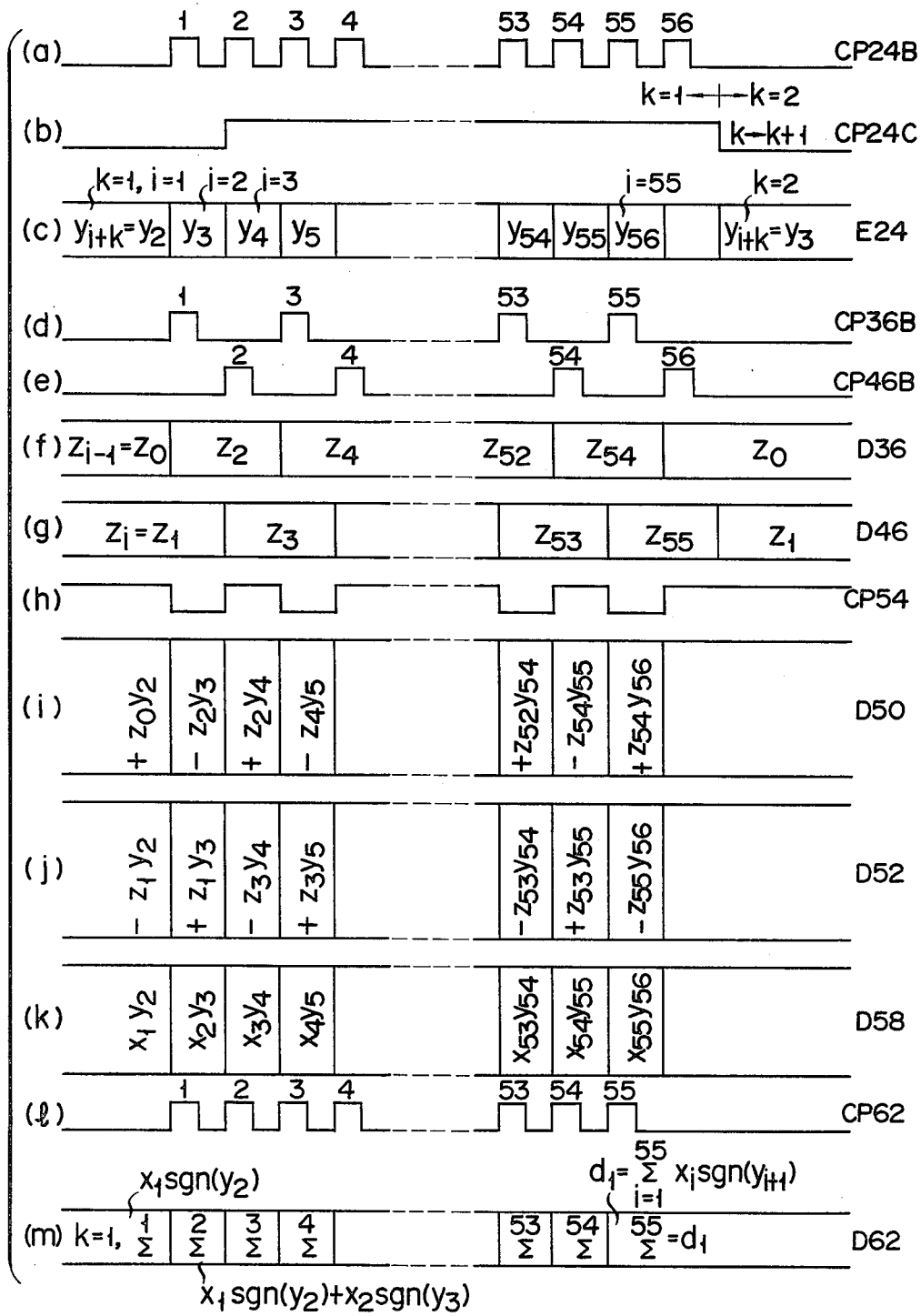
FIG. 12 shows the timing of correlation operation at the condition under k=1.

FIG. 12 shows the timings of correlation operation at the condition under k=1. Before the first pulse of CP24B appears (FIG. 12a), since i=1 and k=1, then $y_{i+k}$ is $y_2$ (FIG. 12c), the contents $Z_{i-1}$ of signal D36 is $Z_0$ (FIG. 12f), the contents $Z_i$ of signal D46 is $Z_1$ (FIG. 12g) and pulse CP54 is logical "1" (FIG. 12h). In this case, the signal D50 is $+Z_0 \cdot y_2$ and the signal D52 is $-Z_1 \cdot y_2$ (FIGS. 12i and 12j). Since $x_1=Z_0-Z_1$, then $D58=D50+D52=Z_0 \cdot y_2 - Z_1 \cdot y_2 = x_1 \cdot sgn(y_2)$ from equation (1) (FIG. 12k). Accordingly, $$\sum_{i=1}^{1} x_i \cdot sgn(y_{i+1}) = x_1 \cdot sgn(y_2)$$

from equation (2) (FIG. 12m).

When the first pulse of CP24B appears, the parameter "i" is incremented by "1" which corresponds to the one clocking of SR 24J by pulse CP24B (FIG. 3), i.e. i=2 (FIGS. 12a and 12c). In this case, $y_{i+k}=y_3$, CP36B="1", CP46B="0" and CP54="0" (FIGS. 12c, 12d, 12e and 12h). Since CP36B="1" and CP46B="0", the contents $Z_{i-1}$ is changed from $Z_0$ to $Z_2$, but the contents $Z_i$ is not changed (FIGS. 12f and 12g). Since CP54="0", the sign of signals D50 and D52 are inverted. Therefore, $D50=-Z_2 \cdot y_3$ and $D52=+Z_1 \cdot y_3$. Since $x_2=Z_1-Z_2$, $D58=D50+D52=Z_1 \cdot y_3 - Z_2 \cdot y_3 = x_2 \cdot sgn(y_3)$ from equation (1) (FIG. 12k). At this time, the first pulse of CP62 which instructs the accumulation of $x_1 \cdot sgn(y_2)$ and $x_2 \cdot sgn(y_3)$ appears (FIG. 12l). Then, $$\sum_{i=1}^{2} x_i \cdot sgn(y_{i+1}) = x_1 \cdot sgn(y_2) + x_2 \cdot sgn(y_3)$$

(FIG. 12m).

When the second pulse of CP24B appears, the parameter "i" is further incremented by "1", i.e. i=3. In this case, $y_{i+k}=y_4$, CP36B="0", CP46B="1" and CP54="1". Since CP36B="0" and CP46B="1", the contents $Z_{i-1}$ is not changed but the contents $Z_i$ is changed from $Z_1$ to $Z_3$. Since CP54="1", $D50=+Z_2 \cdot y_4$ and $D52=-Z_3 \cdot y_4$. Accordingly, $D58=Z_2 \cdot y_4 - Z_3 \cdot y_4 = x_3 \cdot sgn(y_4)$ from equation (1). Then, $$\sum_{i=1}^{3} x_i \cdot sgn(y_{i+1})$$

is obtained from the accumulation by the second pulse of CP62. Similarly, where the 55th pulse of CP24B appears, i.e. i=55, then $y_{i+k}=y_{56}$, CP36B="1", CP46B="0" and CP54="0". In this case, $D50=+Z_{54} \cdot y_{56}$ and $D52=-Z_{55} \cdot y_{56}$. Accordingly, $D58=Z_{54} \cdot y_{56}-Z_{55} \cdot y_{56}=x_{55} \cdot sgn(y_{56})$, and $$d_k = d_1 = \sum_{i=1}^{55} x_i \cdot sgn(y_{i+1})$$

is obtained when the 55th pulse of CP62 appears.

The operation for obtaining data $d_k$ (k=1, 2, ..., 128) is the same as that in the case of data $d_1$. Each operation for obtaining one of data $d_k$ is performed during half horizontal scanning period. In the present embodiment, the whole operation for obtaining all data $d_1, d_2, ..., d_{128}$ is carried out from $V_n=V_{524}$ to $V_n=V_{126}$ (FIGS. 9g and 9l) and the correction of the tap coefficients of transversal filter 10 is carried out from $V_0$ to $V_{127}$. The write enable signal $\overline{WE}$ (FIG. 8z) is therefore generated only during the period between $V_0$ and $V_{127}$. Thus, whole operation for obtaining all data $d_1, d_2, ..., d_{128}$ is performed during one vertical scanning period (1V).

Although specific constructions have been illustrated and described herein, it is not intended that the invention be limited to the elements and constructions disclosed. One skilled in the art will recognize that other particular elements or sub-constructions may be used without departing from the scope and spirit of the invention.

What is claimed is:

1. An automatic equalizer comprising:
   transversal filter means responsive to an input signal and a tap coefficient control signal for equalizing said input signal in accordance with said tap coefficient control signal thereby to provide an equalized output signal;
   sign means coupled to said transversal filter means and responsive to a clock signal and said equalized output signal for generating from said equalized output signal a sign signal according to said clock signal, said sign signal representing the sign of a rate of change of said equalized output signal;

first wave memory means responsive to a first timing signal and said input signal for storing amplitude information of said input signal according to said first timing signal and providing a first wave signal;

second wave memory means responsive to a second timing signal and said input signal for storing amplitude information of said input signal according to said second timing signal and providing a second wave signal;

correlator means coupled to said transversal filter means, said sign means, said first wave memory means and said second wave memory means and responsive to a correlation control signal, said sign signal, said first wave signal and said second wave signal, for correlating said sign signal with said first and second wave signals according to said correlation control signal and providing said tap coefficient control signal; and generator means coupled to said sign means, said first wave memory means, said second wave memory means and said correlator means for generating said clock signal, said first timing signal, said second timing signal and said correlation control signal, the generation timing of these signals being such that the operation of automatic equalization is regulated.

2. An automatic equalizer of claim 1, wherein said transversal filter means includes:

a transversal filter having a plurality of taps, for weighting said input signal transferred therethrough in accordance with given tap coefficients applied to said taps, said transversal filter outputting said equalized output signal which is subjected to said weighting;

memory means coupled to said transversal filter, for storing tap coefficient data designating said given tap coefficients and supplying said tap coefficient data to said transversal filter; and means coupled to said memory means, for changing said tap coefficient data according to said tap coefficient control signal.

3. An automatic equalizer of claim 1, wherein said sign means includes:

means coupled to said transversal filter means, for differentiating said equalized output signal to provide a differentiated signal which contains time base information as to specific positions of wave form of said equalized output signal and polarity information thereof; and read/write means coupled to said differentiating means for writing said differentiated signal therein according to a writing clock, and for reading out written contents thereof as said sign signal according to a reading clock, said writing and reading clocks corresponding to said clock signal.

4. An automatic equalizer of claim 3, wherein said differentiating means includes:

a buffer circuit having an input terminal for receiving said equalized output signal and an output terminal for providing a specific signal with a given output impedance, said specific signal corresponding to said equalized output signal;

a reflex line coupled to the output terminal of said buffer circuit, for absorbing said specific signal, and for feeding the reflected specific signal back to said output terminal with a given delay time which corresponds to the half period of said writing clock, thereby the fed back specific signal being combined with said specific signal at said output terminal, and the circuit impedance of said reflex line being matched with said given output impedance; and means coupled to the output terminal of said buffer circuit, for converting the potential of said specific signal combined with the absorbed, reflected and fed back specific signal of said reflex line into said differentiated signal.

5. An automatic equalizer of claim 3, wherein said read/write means includes:

first register means for storing said differentiated signal according to said writing clock and outputting the stored contents thereof according to a first reading clock which corresponds to said reading clock; and second register means coupled to said first register means, for storing said differentiated signal according to said writing clock, for storing the outputted stored contents of said first register means, and outputting said sign signal according to a second reading clock which corresponds to said reading clock, said sign signal being circulated in said second register means according to said second reading clock, and the circulated contents of said second register means being changed by said outputted stored contents of said first register means according to said first reading clock.

6. An automatic equalizer of claim 1, wherein said first wave memory means includes:

first comparator means for comparing said input signal with a first reference signal to provide a first comparison result;

first buffer means coupled to said first comparator means, for registering said first comparison result and providing the registered contents thereof as a first accumulation control signal according to a first loading pulse which is synchronized with said first timing signal;

first data change means responsive to said first wave signal and coupled to said first buffer means, for changing the contents of said first wave signal according to said first accumulation control signal and providing a first changed result;

first integration means coupled to said first data change means, for integrating said first changed result according to said first timing signal and providing said first wave signal; and first converter means coupled to said first comparator means and said first integration means, for converting said first wave signal to said first reference signal.

7. An automatic equalizer of claim 6, wherein said second wave memory means includes:

second comparator means for comparing said input signal with a second reference signal to provide a second comparison result;

second buffer means coupled to said second comparator means, for registering said second comparison result and providing the registered contents thereof as a second accumulation control signal according to a second loading pulse which is synchronized with said second timing signal;

second data change means responsive to said second wave signal and coupled to said second buffer means, for changing the contents of said second wave signal according to said second accumulation control signal and providing a second changed result;

second integration means coupled to said second data change means, for integrating said second changed result according to said second timing signal and providing said second wave signal; and second converter means coupled to said second comparator means and said second integration means, for converting said second wave signal to said second reference signal, wherein the phase of said second timing signal is opposite to the phase of said first timing signal.

8. An automatic equalizer of claim 1, wherein said first wave memory means includes:

comparator means for comparing said input signal with a reference signal to provide a comparison result;

first buffer means coupled to said comparator means, for registering said comparison result and providing the registered contents thereof as a first accumulation control signal according to said first timing signal;

first data change means responsive to said first wave signal and coupled to said first buffer means, for changing the contents of said first wave signal according to said first accumulation control signal and providing a first changed result;

first integration means coupled to said first data change means, for integrating said first changed result according to said first timing signal and providing said first wave signal;

second buffer means coupled to said comparator means, for registering said comparison result and providing the registered contents thereof as a second accumulation control signal according to said second timing signal;

second data change means responsive to said second wave signal and coupled to said second buffer means, for changing the contents of said second wave signal according to said second accumulation control signal and providing a second changed result;

second integration means coupled to said second data change means, for integrating said second changed result according to said second timing signal and providing said second wave signal;

means coupled to said first and second integration means, for combining said first wave signal with said second wave signal to provide a wave integration signal; and converter means coupled to said comparator means and said multiplying means, for converting said wave integration signal to said reference signal.

9. An automatic equalizer of any one of claims 1 to 8, wherein said correlator means includes:

process means responsive to an inverting clock which is synchronized with said first and second timing signals and coupled to said sign means, first wave memory means and second wave memory means, for subtracting a component of said first wave signal from a component of said second wave signal, for multiplying the subtracted result by said sign signal, and for providing a subtracted/multipled result, each phase of the components of said first and second wave signals being alternatively inverted according to said inverting clock; and accumulation means responsive to said correlation control signal and coupled to said process means, for accumulating said subtracted/multiplied result according to said correlation control signal, and for providing said tap coefficient control signal which contains polarity information of an accumulated result of said subtracted/multipled result.

10. An automatic equalizer of claim 9, wherein said process means includes:

sign generator means responsive to said inverting clock and coupled to said sign means, for generating a first sign signal corresponding to said sign signal and a second sign signal corresponding to said sign signal, the phase of said first sign signal being identical with that of said sign signal when said inverting clock has one logical level, the phase of said first sign signal being opposite to that of said sign signal when said inverting clock has the other logical level, and the phase of said first sign signal being opposite to that of said second sign signal;

first converter means coupled to said first wave memory means and sign generator means, for converting the sign of said first wave signal by said first sign signal to provide a first converted result;

second converter means coupled to said second wave memory means and sign generator means, for converting the sign of said second wave signal by said second sign signal to provide a second converted result; and means coupled to said first and second converter means, for combining said first converted result with said second converted result to form said subtracted/multiplied result.

11. An automatic equalizer of claim 10, wherein said first converter means includes an exclusive OR circuit one input of which receives said first sign signal and another input of which receives said first wave signal.

12. An automatic equalizer of claim 11, wherein said second converter means includes an exclusive OR circuit one input of which receives said second sign signal and another input of which receives said second wave signal.

13. An automatic equalizer of claim 12, wherein said combining means includes a full adder for adding said first and second converted result and outputting said subtracted/multipled result.

14. An automatic equalizer of claim 9, wherein said accumulation means includes:

means coupled to said process means, for combining said subtracted/multiplied result with said accumulated result to form a combined result;

means responsive to said correlation control signal and coupled to said combining means, for storing said combined result and outputting said accumulated result according to said correlation control signal; and means coupled to said storing means, for discriminating the polarity or sign of said accumulated result to generate said tap coefficient control signal whose polarity corresponds to the polarity of said accumulated result.

15. A correlator comprising:

wave means responsive to a first reference signal, for dividing a wave form of said first reference signal into fragments along time base, for providing a first wave signal which contains amplitude information of odd number fragments of the divided first reference signal, and for providing a second wave signal which contains amplitude information of even number fragments of the divided first reference signal;

subtraction means coupled to said wave means and responsive to a second reference signal corresponding to said first reference signal as well as responsive to a subtraction control signal, for subtracting one fragment of said first wave signal from another fragment of said second wave signal when said subtraction control signal has one level, for subtracting one fragment of said second wave signal from another fragment of said first wave signal when said subtraction control signal has another level, and for multiplying a result of the subtraction by said second reference signal in order to provide a correlation signal; and accumulation means coupled to said subtracting means, for accumulating said correlation signal to provide a correlation output signal which is used for a correlation control of said first reference signal.

16. A correlator of claim 15, wherein said wave means includes:

comparator means for comparing said first reference signal with a comparison signal to provide a comparison result;

first buffer means coupled to said comparator means, for registering said comparison result and providing the registered contents thereof as a first accumulation control signal;

first data change means responsive to said first wave signal and coupled to said first buffer means, for changing the contents of said first wave signal according to said first accumulation control signal and providing a first changed result;

first integration means coupled to said first data change means, for integrating said first changed result and providing said first wave signal;

second buffer means coupled to said comparator means, for registering said comparison result and providing the registered contents thereof as a second accumulation control signal;

second data change means responsive to said second wave signal and coupled to said second buffer means, for changing the contents of said second wave signal according to said second accumulation control signal and providing a second changed result;

second integration means coupled to said second data change means, for integrating said second changed result and providing said second wave signal;

means coupled to said first and second integration means, for combining said first wave signal with said second wave signal to provide a wave integration signal; and converter means coupled to said comparator means and said multiplying means, for converting said wave integration signal to said comparison signal.

17. A correlator of claim 15 or 16, wherein said subtraction means includes:

sign generator means responsive to said subtraction control signal and said second reference signal, for generating a first sign signal and a second sign signal each corresponding to said second reference signal, the phase of said first sign signal being identical with that of said second reference signal when said subtraction control signal has one logical level, the phase of said first sign signal being opposite to that of said second reference signal when said subtraction control signal has the other logical level, and the phase of said first sign signal being opposite to that of said second sign signal;

first multiplier means coupled to said wave means and sign generator means, for multiplying said first wave signal by said first sign signal to provide a first multiplied result;

second multiplier means coupled to said wave means and sign generator means, for multiplying said second wave signal by said second sign signal to provide a second multiplied result; and means coupled to said first and second multiplier means, for combining said first multiplied result with said second multiplied result to form said correlation signal 18. A correlator of claim 17, wherein said first multiplier means includes an exclusive OR circuit one input of which receives said first sign signal and another input of which receives said first wave signal.

19. A correlator of claim 18, wherein said second multiplier means includes an exclusive OR circuit one input of which receives said second sign signal and another input of which receives said second wave signal.

20. A correlator of claim 19, wherein said combining means includes a full adder for adding said first and second multiplied result and outputting said correlation signal.

21. A correlator of claim 15 or 16, wherein said accumulation means includes:

means coupled to said subtraction means, for combining said correlation signal with said correlation output signal to form a combined result; and means coupled to said combining means, for storing said combined result and outputting said correlation output signal.

22. A correlator of claim 17, wherein said accumulation means includes:

means coupled to said subtraction means, for combining said correlation signal with said correlation output signal to form a combined result; and means coupled to said combining means, for storing said combined result and outputting said correlation output signal.

* * * * *